United States Patent
Farrell et al.

(10) Patent No.: US 9,420,917 B2
(45) Date of Patent: Aug. 23, 2016

(54) METHOD FOR BLENDING FOOD OR BEVERAGES

(75) Inventors: James J. Farrell, Belvedere, CA (US); Jens P. Voges, Oakland, CA (US); Clayton G. Gardner, Alamo, CA (US); Steve T. Connell, San Francisco, CA (US); Shek Fai Lau, Foster City, CA (US); Gage C. Cauchois, Oakland, CA (US); Joseph M. Lehman, New Albany, OH (US); Chris M. Bradley, Orinda, CA (US); Alan S. Crarer, Pacifica, CA (US); Jeffrey A. Tilley, La Honda, CA (US)

(73) Assignee: F'real Foods, LLC, Orinda, CA (US)

( * ) Notice: Subject to any disclaimer, the term of this patent is extended or adjusted under 35 U.S.C. 154(b) by 615 days.

(21) Appl. No.: 13/533,938

(22) Filed: Jun. 26, 2012

(65) Prior Publication Data

US 2013/0341439 A1 Dec. 26, 2013

(51) Int. Cl.
*A47J 43/07* (2006.01)
*B01F 7/16* (2006.01)
*B01F 13/04* (2006.01)
*B01F 15/00* (2006.01)

(52) U.S. Cl.
CPC .......... *A47J 43/0705* (2013.01); *B01F 7/1605* (2013.01); *B01F 13/047* (2013.01); *B01F 15/00253* (2013.01)

(58) Field of Classification Search
CPC ...... B01F 7/16; B01F 7/1605; B01F 13/047; A47J 43/0711; A47J 2043/04463; A47J 43/0705
USPC ................................. 366/244, 197, 209, 203
See application file for complete search history.

(56) References Cited

U.S. PATENT DOCUMENTS

| | | | | |
|---|---|---|---|---|
| 2,110,498 A | * | 3/1938 | Carnahan | A47J 43/044 366/203 |
| 2,626,133 A | * | 1/1953 | Reed | 366/206 |
| 2,662,489 A | * | 12/1953 | Moffett, Jr. | A23G 9/045 366/203 |
| 2,668,506 A | * | 2/1954 | Moffett, Jr. | A23G 9/22 366/203 |
| 4,740,088 A | * | 4/1988 | Kelly, Jr. | 366/138 |
| 4,822,175 A | * | 4/1989 | Barnard et al. | 366/347 |
| 5,067,819 A | * | 11/1991 | Heinhold et al. | 366/138 |
| 5,803,377 A | | 9/1998 | Farrell | |

(Continued)

OTHER PUBLICATIONS

Supplemental Partial European Search Report for Application No. EP13808961, dated Apr. 1, 2016, one page.

*Primary Examiner* — Charles Cooley
*Assistant Examiner* — Marc C Howell
(74) *Attorney, Agent, or Firm* — Sideman & Bancroft LLP; Guy W. Chambers

(57) ABSTRACT

A method for blending food or beverages, preferably using a blender that is compact enough for home use, rugged enough to blend frozen beverages, simple to use and safe. The blender includes an upper housing, with a front housing door, that covers the moving blending machinery. The blender also includes a cupholder receiving area which allows the user to safely insert a frozen beverage cup inside a cupholder for blending. After the start button is pressed, a cupholder lip will be grasped by the clamping jaw of an elevator assembly to lift the cupholder up. As the cupholder is lifted upward, a cover will be pressed over the top opening of the inserted cup to prevent spillage during blending. The elevator assembly will then continue to lift the cupholder upward until the rotating cutter blades of a spindle assembly cut through successive layers of the frozen beverage.

21 Claims, 35 Drawing Sheets

(56) References Cited

U.S. PATENT DOCUMENTS

| | | |
|---|---|---|
| 5,962,060 A | 10/1999 | Farrell |
| 6,326,047 B1 | 12/2001 | Farrell |
| 6,435,708 B1 | 8/2002 | Huang |
| 6,465,034 B2 | 10/2002 | Farrell |
| 6,474,862 B2 | 11/2002 | Farrell |
| 6,527,207 B1 | 3/2003 | Farrell |
| 7,144,150 B2 | 12/2006 | Farrell |
| 7,520,658 B2 | 4/2009 | Farrell |
| 7,520,662 B2 | 4/2009 | Farrell |
| 2005/0201198 A1* | 9/2005 | Farrell ............................ 366/138 |
| 2005/0249032 A1* | 11/2005 | Heinhold et al. .............. 366/289 |
| 2009/0186141 A1* | 7/2009 | Almblad et al. ............... 426/590 |
| 2010/0108696 A1 | 5/2010 | Farrell |
| 2011/0088558 A1 | 4/2011 | Farrell et al. |
| 2011/0088568 A1 | 4/2011 | Farrell et al. |
| 2011/0090756 A1 | 4/2011 | Farrell et al. |

* cited by examiner

METHOD FOR BLENDING FOOD OR BEVERAGES

FIELD OF THE INVENTION

The present invention relates to methods of operating food preparation machines, particularly electrical blenders for preparing smoothies, milkshakes, protein shakes and other blended beverages.

BACKGROUND OF THE INVENTION

Blended fruit smoothies, milkshakes and protein shakes are becoming increasingly popular among health conscious people. In these blended drinks, fresh fruits and/or vegetables can be mixed together with, if desired, vitamins and protein supplements to provide fresh nutritious foods in a convenient, portable form.

While it is advantageous to blend carefully selected ingredients at the peak of their freshness, it is often not practical to do so. To have fresh fruits and vegetables available every day, for example, one may need to frequently go shopping for such fruits/vegetables, give the fruits/vegetables time to ripen and then make sure that the fruits/vegetables do not over ripen. Moreover, working with fresh fruits and vegetables usually generates organic wastes, is often messy and inevitably requires clean up. This means a lot of time and attention.

In a fast moving society, there is a demand for a fresh, nutritious blended drink that can be selected and prepared quickly. Better yet, such a fresh, blended drink should be available at a place that can be easily accessed, such as a convenience store or one's home.

F'Real Foods, LLC has made a business of making fresh, nutritious smoothies and milkshakes available at easily accessible locations, such as convenience stores. F'Real Foods starts with fresh ingredients, such as fresh fruits and milk, which it pre-blends into smoothies and milkshakes. The pre-blended smoothies and milkshakes are then frozen in sealed cups before they are shipped to convenience stores at many different locations. The frozen pre-blended smoothies and milkshakes are then stored in a freezer at the convenience store next to a commercial size blending machine. When the convenience store customer wants a fresh smoothie or milkshake, the customer simply selects the desired frozen, pre-blended smoothie or milkshake from the convenience store freezer, tears the seal off the top of the smoothie/milkshake cup and then places the smoothie/milkshake cup in a blending machine cupholder built into the blending machine. The customer can then start the commercial sized blending machine to blend the frozen smoothie/milkshake to a desired consistency.

F'Real Foods, LLC has numerous U.S. patents and U.S. published patent applications pertaining to its commercial size blending machine and processes for preparing smoothies/milkshakes, including U.S. Pat. Nos. 5,803,377; 5,962,060; 6,041,961; 6,326,047; 6,474,862; 6,465,034; 6,527,207; 7,144,150; 7,520,658 and 7,520,662 as well as U.S. Published Patent Application Nos. 2011/0088558; 2011/0088568 and 2011/0090756.

The popularity of F'Real Foods, LLC's convenience store smoothies and milkshakes has led to a demand to make the same sort of smoothies and milkshakes available for home use. Nonetheless, creating a smoothie/milkshake blender for home use poses a much different set of design problems than creating a smoothie/milkshake blender for commercial use. For example, space is often in short supply inside a kitchen at home. While a convenience store blender can be made to be tall, a homeowner will often want a blender at home to fit within a tight space between an upper kitchen cabinet and a lower kitchen cabinet. Moreover, a convenience store blender should be made of heavy duty materials, such as stainless steel, to withstand repeated, rugged use. By contrast, such a heavy duty, stainless steel blender would be too expensive for most homeowners. While homeowners appreciate having a rugged, reliable blender, they would want such a blender to be lighter in weight and less expensive than the blenders used in convenience stores. Thus, there is a demand in the art for a rugged blender for home use that is compact in size and can still blend frozen smoothies/milkshakes reliably.

BRIEF SUMMARY OF THE INVENTION

The present invention is directed to a method for blending food or beverages, preferably using a blender that is compact enough for home use, rugged enough to blend frozen beverages, simple for homeowners to use and safe. The blender of the present invention preferably includes an upper housing, with a front housing door, that covers the moving blending machinery and prevents injury to the user. The blender also preferably includes a cupholder receiving area which allows the user to safely insert a frozen beverage cup inside a cupholder for blending. When the cup and cupholder are properly inserted in the cupholder receiving area, a start button will preferably light up to indicate that the blender is ready to blend the frozen contents in the cup. When the user then presses the start button, a cupholder lip will be grasped by the clamping jaw of an elevator assembly to lift the cupholder upward. As the cupholder is lifted upward, a cup cover will be pressed over the top opening of the cup to prevent spillage during blending. The elevator assembly will then continue to lift the cupholder upward until the rotating cutter blades of a spindle assembly make contact with the frozen beverage. The rotating cutter blades of the spindle assembly will cut through layers of the frozen beverage while the cupholder continues to be lifted until the cupholder has been lifted to the point where the rotating cutter blades are mixing frozen beverage at the bottom of the cup. To achieve a desired consistency for the smoothie/milkshake, the elevator assembly may raise and lower the cupholder multiple times while the rotating cutter blade of the spindle assembly is in operation. When the desired consistency of the smoothie/milkshake is obtained, the elevator assembly lowers the cupholder back to its original position in the cupholder receiving area of the blender. At that point, the user can remove the cupholder from the blender, separate the cup from the cupholder and then enjoy the blended smoothie/milkshake from the cup.

The blender of the present invention has several preferred features which allow it to perform safely and reliably. For example, in order to prevent the cup from spinning inside the cupholder when the rotating cutting blades are blending the frozen beverage, both the cup and cupholder preferably have complementary anti-rotational surfaces. The anti-rotational surfaces of the cup preferably include vanes that protrude from the bottom of the cup. These vanes mate with complementary vanes on the bottom of the cupholder to prevent the cup and cupholder from rotating with respect to one another when the rotating cutter blade is in operation. As additional safety features, sensors or switches are preferably built into the blender to make sure the cupholder is properly positioned and the front housing door is latched in a locked, closed position before the rotating cutter blade starts moving. In order to make sure that the cupholder is raised during blending in a reliable, even way, dual lead screws of the elevator assembly are preferably actuated by a single motor to lift the cupholder.

To facilitate cleaning, the front housing door can be opened to expose the spindle and lead screw assemblies. The spindle assembly can be easily removed for cleaning by turning a quick release coupling member at the top of the spindle assembly and then pulling the spindle assembly downward. A cup cover is constructed on the spindle assembly to reduce the need for blender cleaning. As the elevator assembly begins to pull the cupholder upward during operation, the spindle assembly cup cover firmly attaches to the top of the cup to prevent beverage from splashing out during blending. When the elevator assembly pulls the cupholder upward and the clamping jaw presses the cup cover over the top of the cup, a lever lock mechanism ensures that the cup cover stays clamped to the cup.

DETAILED DESCRIPTION OF THE INVENTION

Figure 1:
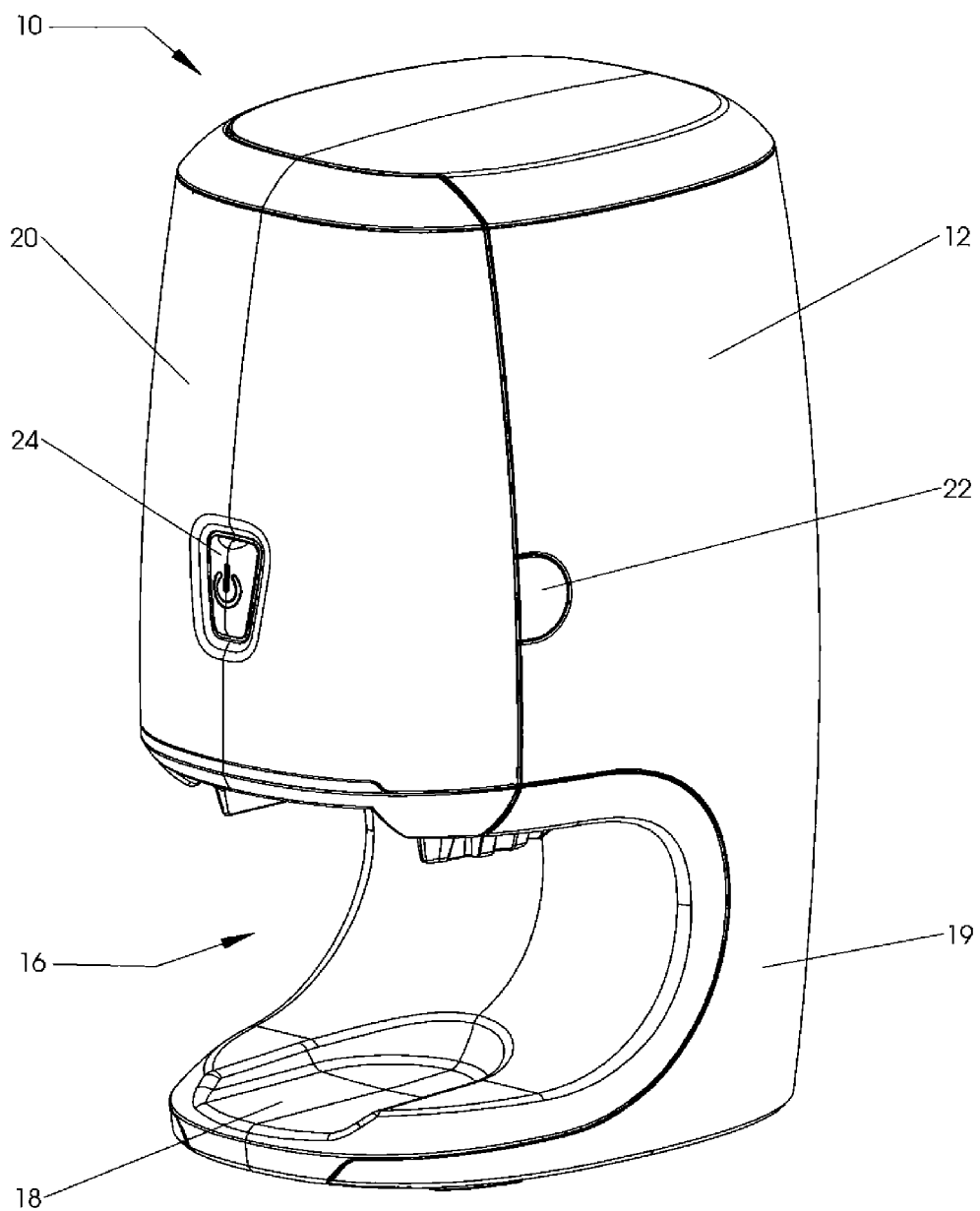
FIG. 1 shows a perspective view of a preferred blender of the present invention before the cup and cupholder are placed in the cupholder receiving area.

FIG. 1 illustrates a preferred blender 10 of the present invention as it would be viewed from the outside. This blender 10 has an upper housing 12 and a cupholder receiving area 16. The upper housing 12 encloses the moving parts of the blender 10 and, in order to prevent injury to the user, the upper housing 12 blocks the user from touching the moving parts while those moving parts are in operation. On the front of the upper housing 12, there is a hinged front housing door 20 that can be opened by pressing the front door latch 22. This front housing door 20 allows the user to access the moving parts of the blender 10 for cleaning and maintenance while those moving parts are not in operation. In contrast to the upper housing 12, the cupholder receiving area 16 is preferably open in order to allow a product to be inserted under the upper housing 12 before blending. In the preferred embodiment, the cupholder receiving area 16 preferably consists of stand 19 which connects the cupholder receiving area base 18 to the upper housing 12. Those of skill in the art will, nonetheless, recognize that other designs can be used for the cupholder receiving area 16 so long as a product can be inserted under the upper housing 12 before blending.

Figure 2:
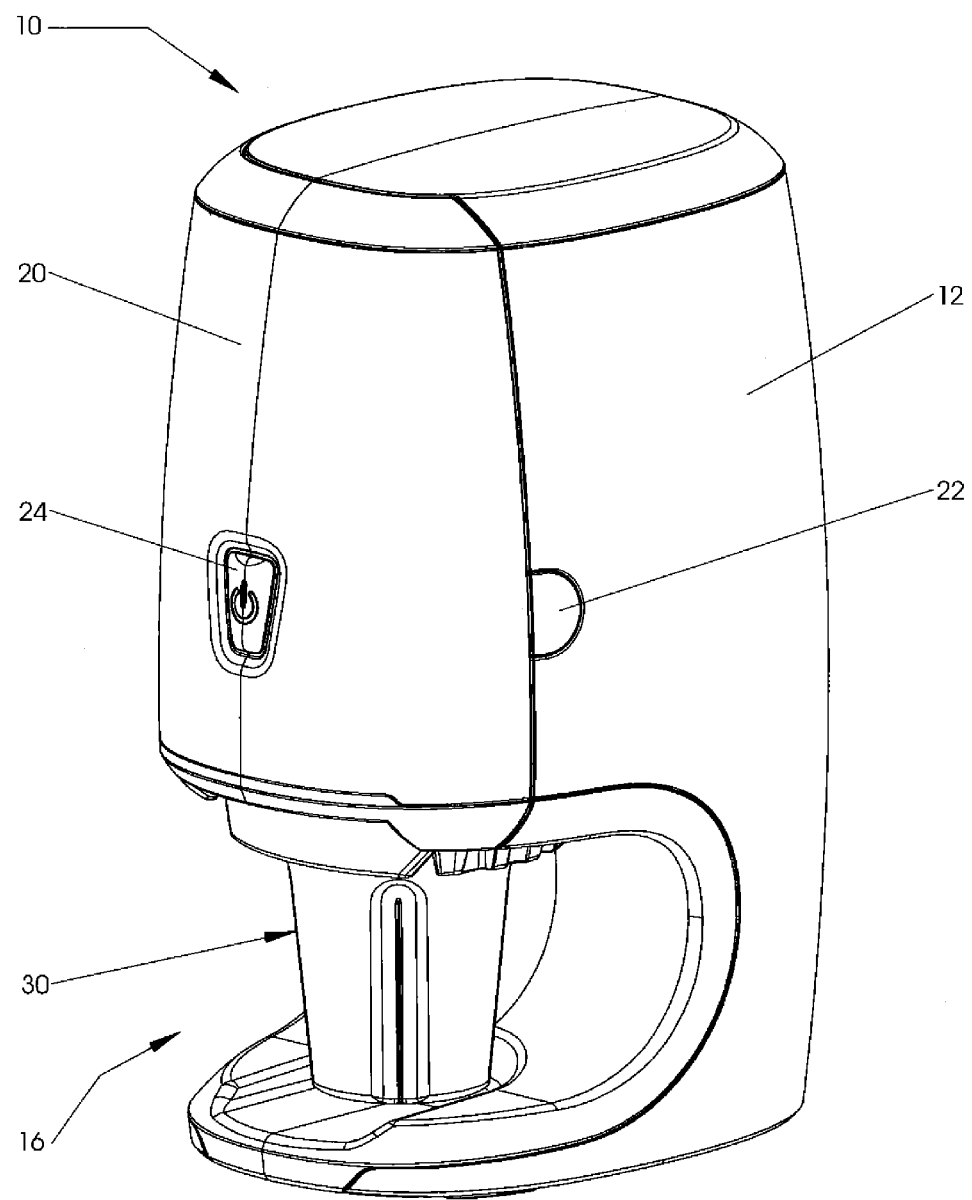
FIG. 2 shows a perspective view of the blender of FIG. 1 after the cup and cupholder have been placed in the cupholder receiving area.

FIG. 2 shows how a cupholder 30 can be inserted into the cupholder receiving area 16 of the blender 10. The product to be blended, such as a frozen smoothie, milkshake or protein shake, is preferably inside the cupholder 30 itself or within a cup 40 (FIG. 5) that is placed within the cupholder 30. Those of skill in the art will recognize that other sorts of containers besides cupholder 30 and/or cup 40 can be used to hold the food or beverage product so long as the container fits within the cupholder receiving area 16 and can be operated upon by the blender machinery. While the blender 10 of the present invention is constructed to be rugged enough to blend frozen food and/or beverage products, those of skill in the art will readily recognize that the food products do not need to be frozen. For example, the blender 10 of the present invention can also blend beverages having fresh, unfrozen fruits, vegetables and/or dairy products. Nonetheless, if the food and/or beverage products to be blended are frozen, it is preferred that water, milk or other liquid be added on top of the frozen food and/or beverage products before blending to place less strain on the blending machinery and to produce a better product consistency. This added liquid is preferably within the range of 5 to 30% by volume as compared with the volume of the frozen food and/or beverage. In some embodiments, the blending machinery may even include a sensor to sense whether sufficient liquid has been added before blending and, if not, remind the user to add liquid.

A start button 24 is preferably located on the front housing door 20 of the upper housing 12. In a preferred embodiment, the start button 24 will light up briefly (e.g., for 5 seconds) with a green color when the blender is plugged into an electrical outlet and light up briefly again with a green color when a cupholder 30 has been properly inserted within the cupholder receiving area 16. In an alternative embodiment, the start button 24 can light up in a different color, such as red, when the blender 10 is not yet ready for operation. This alternative embodiment is less preferred because the start button will be lit up for longer periods and thus draw more electricity. In the preferred embodiment, pushing the start button 24 will only activate the blender 10 for operation when the start button 24 is or has been green in color. Determining whether the blender 10 is ready for operation will preferably depend on such factors as whether the front door latch 22 is properly closed and whether the cupholder 30 has been placed in its proper position in the cupholder receiving area 16. In a further alternative embodiment, a visual display (not shown) can be included on the front door 20 near the start button 24 that tells the user in words why the blender 10 may not yet be ready for operation. For example, the visual display can tell the user to close the front door latch 22 or correctly position the cupholder 30.

Figure 3:
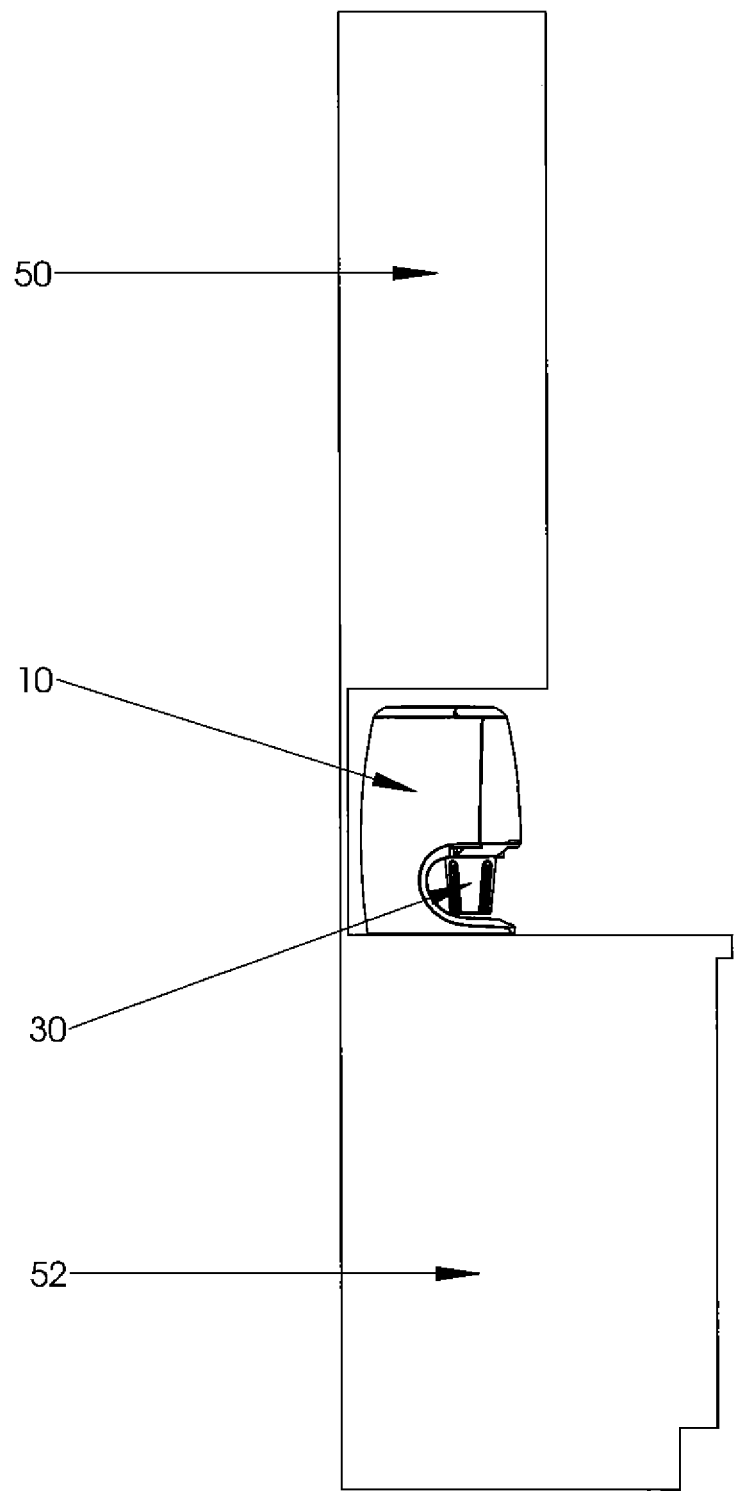
FIG. 3 shows how the preferred blender of the present invention can fit into the tight space between an upper cabinet and a lower cabinet in a typical kitchen.

FIG. 3 illustrates how the blender 10 of the present invention might be positioned between an upper cabinet 50 and a lower cabinet 52 in a typical kitchen at home. In some home kitchens, the distance between the upper cabinet 50 and the lower cabinet 52 can be 18 inches or less. To accommodate its use in such tight kitchen spaces, the preferred blender 10 of the present invention has been designed to be as compact as possible. For example, the cupholder receiving area 16 has been designed to allow the cup 40 and cupholder 30 to be slid in horizontally. This is a distinguishing feature between the preferred blender 10 of the present invention and the much taller blenders currently in commercial use by F'Real Foods. In F'Real Foods' commercial blenders, the cupholder is built into the commercial blender so that a cup having frozen beverage is placed into the commercial cupholder from above while the cupholder is attached from below to the commercial blender. In order to make the blender 10 of the present invention as compact as possible, there is not enough space to allow the cup 40 to be placed into the cupholder 30 from above while the cupholder 30 is attached from below to the blender 10. Instead, the cupholder 30 in the present invention is preferably separate from the blender 10. For the present invention, the cup 40 is preferably placed in the cupholder 30 outside the blender 10 so that the combined cup 40/cupholder 30 can be horizontally inserted together into the cupholder receiving area 16.

Figure 2A:
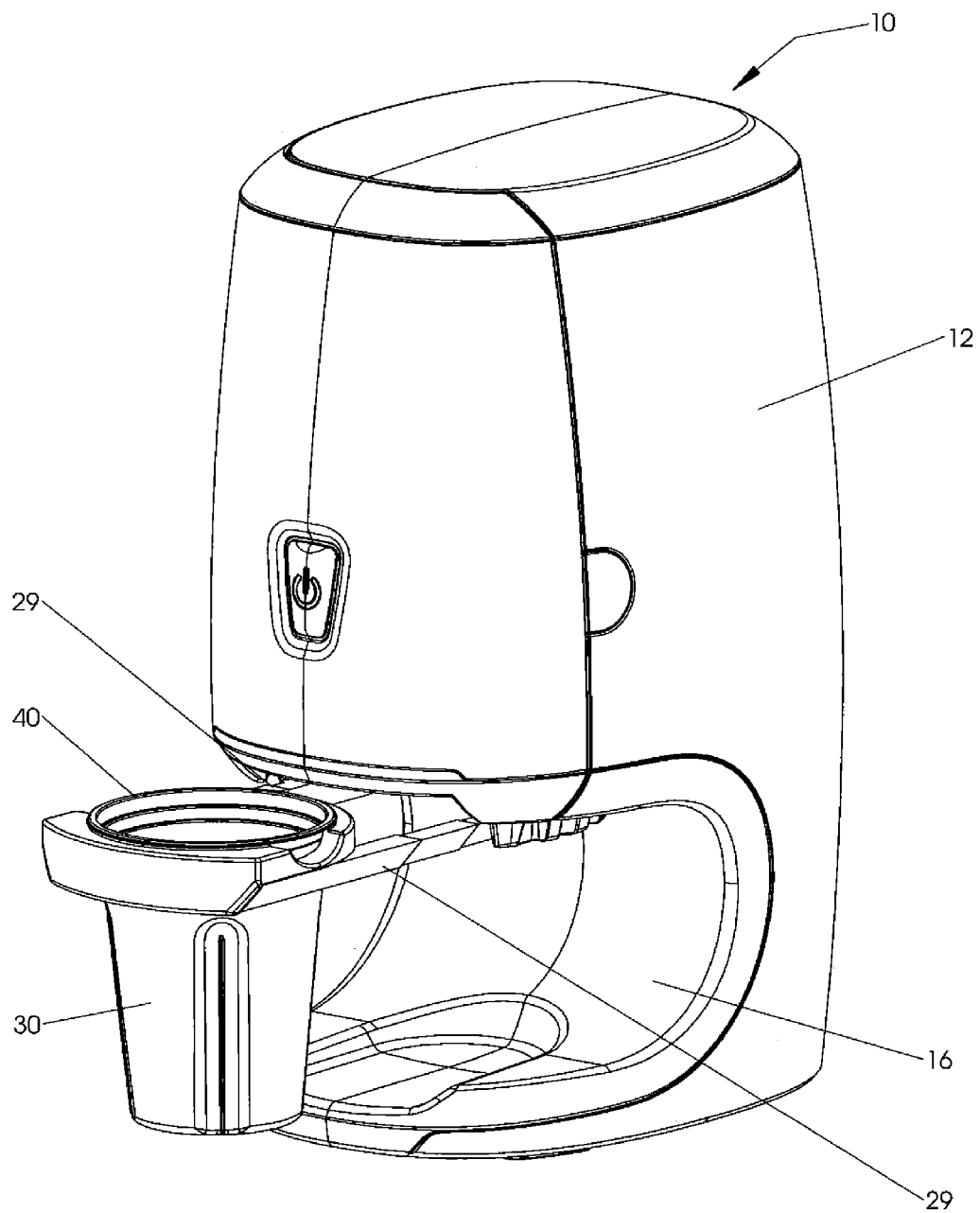
FIG. 2A shows a perspective view of an alternative blender embodiment where the cupholder is integrated into the blender.

FIG. 2A illustrates an alternative embodiment where the blender 10 has the same compact size, but has the cupholder 30 being attached to an extension of the blender 10, rather than separate from the blender 10. In the FIG. 2A embodiment, two rails 29 are used to attach the cupholder 30 to the blender 10. The rails 29 are preferably telescoping so that the cupholder 30 can be horizontally pulled out and then pushed into the cupholder receiving area 16 as the rails 29 expand and contract. Preferably, the cupholder 30 is permanently attached to the rails 29 in this embodiment so that it will never be inadvertently separated from the blender and misplaced. As those of skill in the art will recognize, though, the cupholder 30 could also be separable from the rails 29, which would have the advantage of making the cupholder 30 easier to clean.

Figure 4:
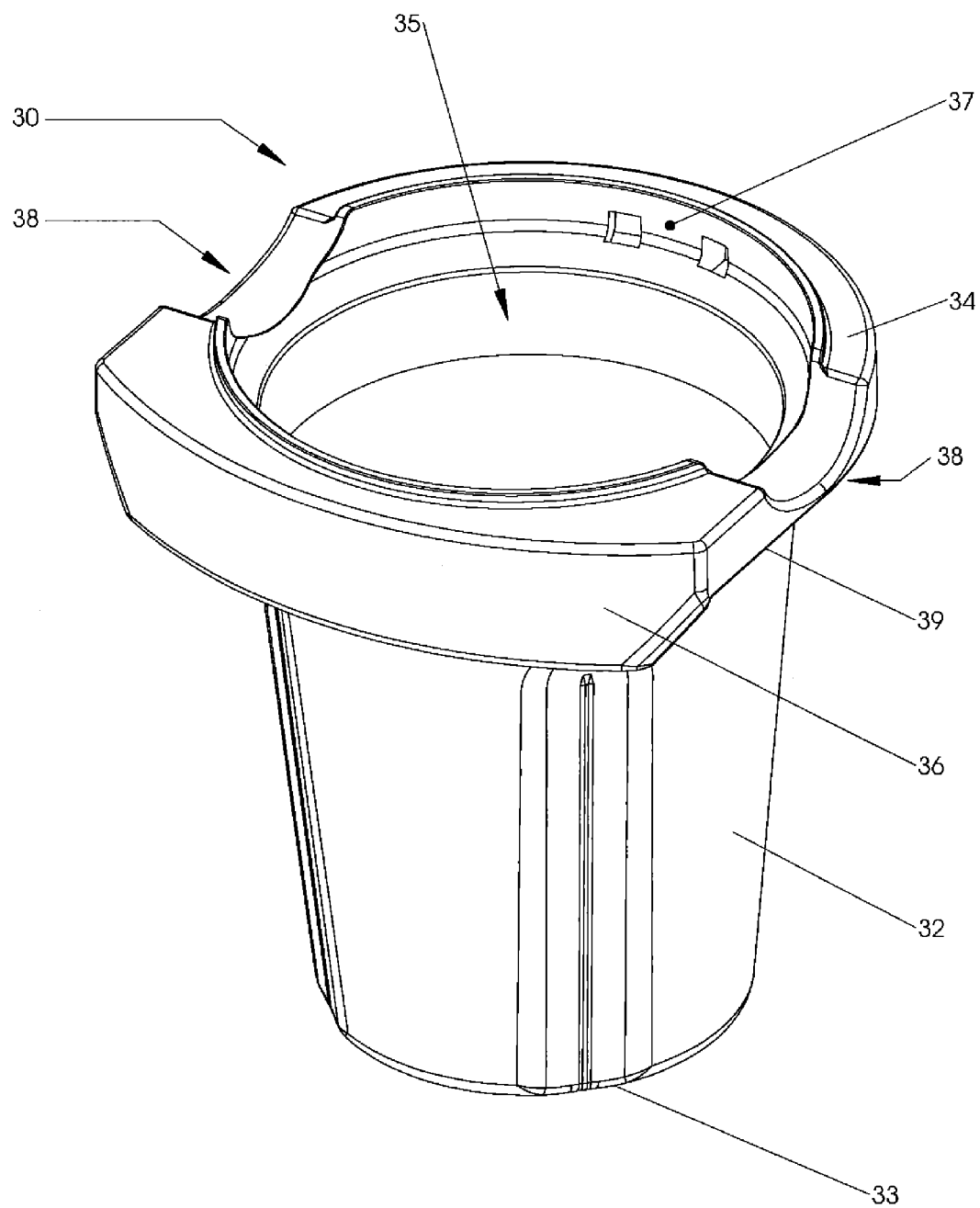
FIG. 4 shows a perspective view of a preferred form of cupholder.

FIG. 4 provides a close up view of a preferred form of cupholder 30 of the present invention. As those of skill in the art will recognize, the cupholder 30 can do more than simply hold a cup with food or beverage. For example, as previously noted, the food or beverage can be placed directly within the cupholder 30 thereby obviating the need to also use a cup. Further, if one wanted to use the blender 10 of the present invention to mix non-food products, such as paints, the cupholder 30 could be used to hold those non-food products. For these reasons, the cupholder 30 acts as a product positioning device whether that product is contained in a cup or not.

Figure 5:
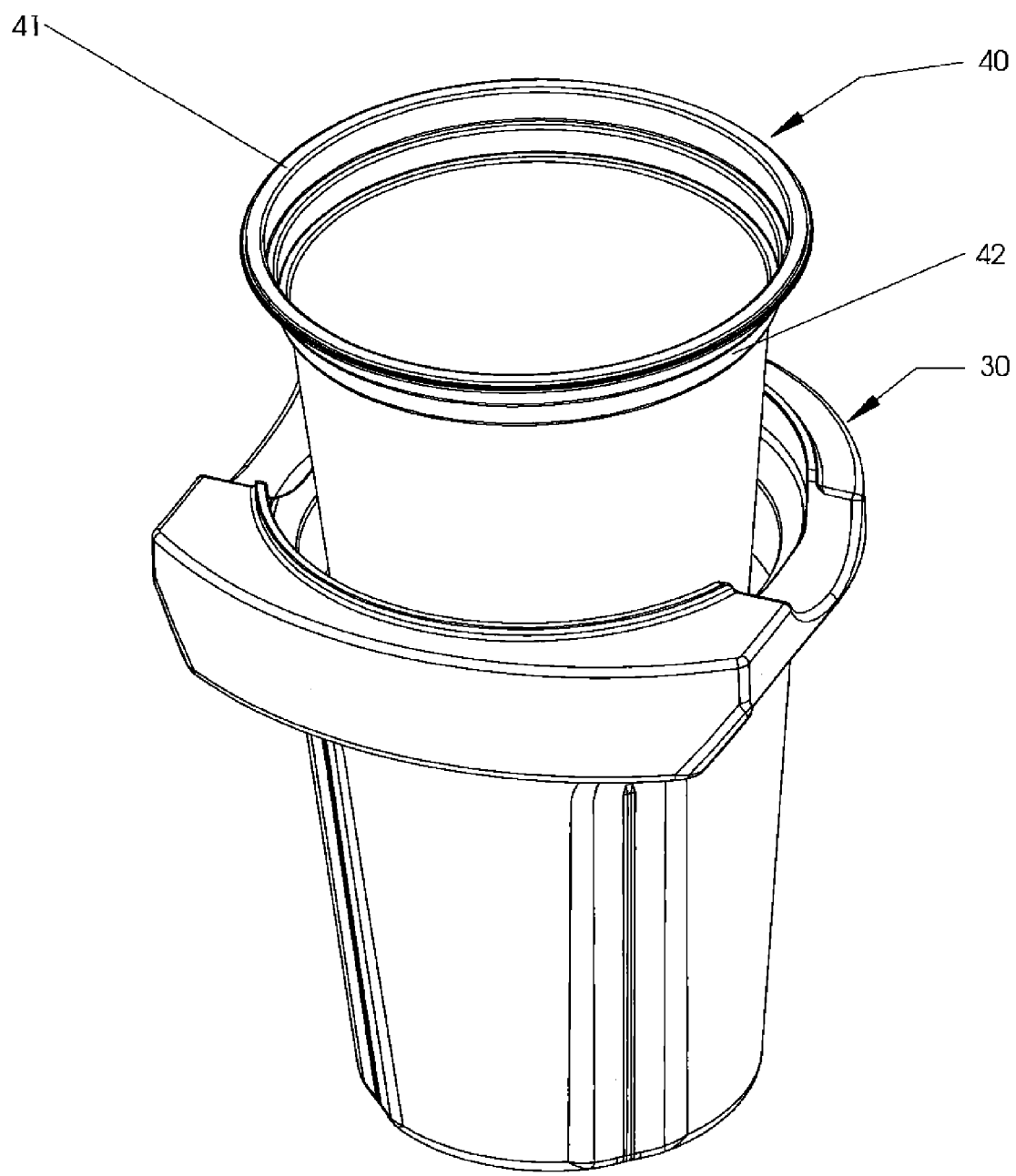
FIG. 5 shows how a cup can be inserted into the FIG. 4 cupholder.

In its preferred form, the cupholder 30 of the present invention preferably has a generally cylindrically shaped body 32 having a bottom 33 and open top 35. A cupholder upper lip 34 is preferably formed along the upper edge of the cupholder body 32. The cupholder upper lip 34 preferably has an overhanging front portion 36 that allows a user to slide his or her fingers underneath the overhang to conveniently push the cupholder 30 into the cupholder receiving area 16 or pull it out. The cupholder 30 preferably also has substantially straight side edges 39 to prevent the cupholder from rotating during the blending process. While FIG. 4 shows the substantially straight edges 39 on the upper lip 34 of the cupholder, the substantially straight side edges 39 could also be formed on other parts of the cupholder 30, such as the cupholder bottom, and still achieve the same antirotational function. On the sides of the cupholder lip 34 are preferably two lip indentations 38 which allow a user to grip the cup 40 when it is inserted into the cupholder 30 and easily remove the cup 40 from the cupholder (FIG. 5). A presence indicator 37 is preferably placed at the rear of the cupholder lip 34. In one embodiment, the presence indicator 37 can take the form of a magnet which can be sensed by the blender 10 to indicate that the cupholder is properly positioned in the cupholder receiving area 16.

FIG. 5 illustrates how a cup 40, having upper lip 41, can be placed in the cupholder 30 before they both are inserted into the cupholder receiving area 16 of the blender 10. In one preferred embodiment, the cup 40 contains frozen food or beverage product. In that preferred embodiment, frozen food or beverage fills the cup between one half and three quarters of the way from the bottom of the cup to the top of the cup. In this preferred embodiment, liquid is added on top of this frozen food or beverage to facilitate the blending process but, again, space is left between the top of the fluid and the top of the cup 40 before blending. It is helpful to leave space at the top of the cup because the food or beverage tends to expand in volume during blending as air is whipped into the mixture. Leaving room at the top prevents the blended food or beverage from overflowing and thereby creating a mess that needs to be cleaned. Rings 42 or other markers can be placed on the cup to tell the user the maximum height recommended for adding liquid.

Figure 6:
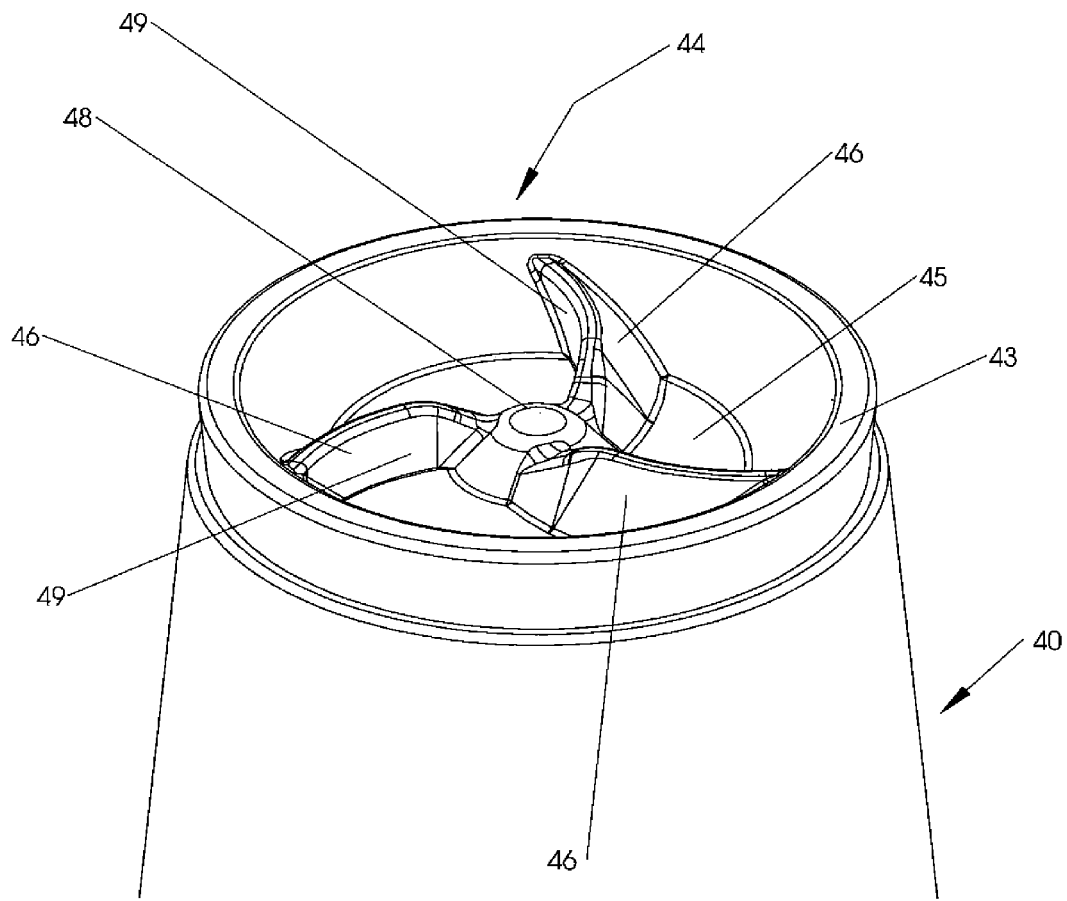
FIG. 6 is a bottom view of a cup illustrating a preferred form of anti-rotational surface.

FIG. 6 shows a bottom perspective view of a preferred cup 40 of the present invention having an anti-rotational surface 44. Anti-rotational surfaces 44 which can advantageously be used in the blender 10 of the present invention are described in U.S. Published Patent Application No. 2010/0108696 and U.S. Pat. No. 6,041,961, the disclosures of which are hereby incorporated by reference. In a preferred form, as described in U.S. Published Patent Application No. 2010/0108696, the cup's anti-rotational surface 44 preferably has multiple vanes 46 which protrude downward from a generally flat bottom cup surface 45. The vanes 46 are each preferably substantially triangular in cross-section and extend outwardly from a protruding center portion 48 such that no two vanes 46 are angularly separated by 180 degrees. The protruding sides of the vanes 46 are preferably steep to better seat the anti-rotational surface 44 in a complementary cupholder anti-rotational surface 60 (FIG. 7) and also to create a drive surface 49 which locks the anti-rotational surfaces 44, 60 together. In some embodiments, the drive surface 49 of the vanes 46 forms an overhanging surface. To help the anti-rotational surfaces 44 properly seat in the cupholder 30, a protruding rim 43 can be formed around the periphery of the vanes 46.

Figure 7:
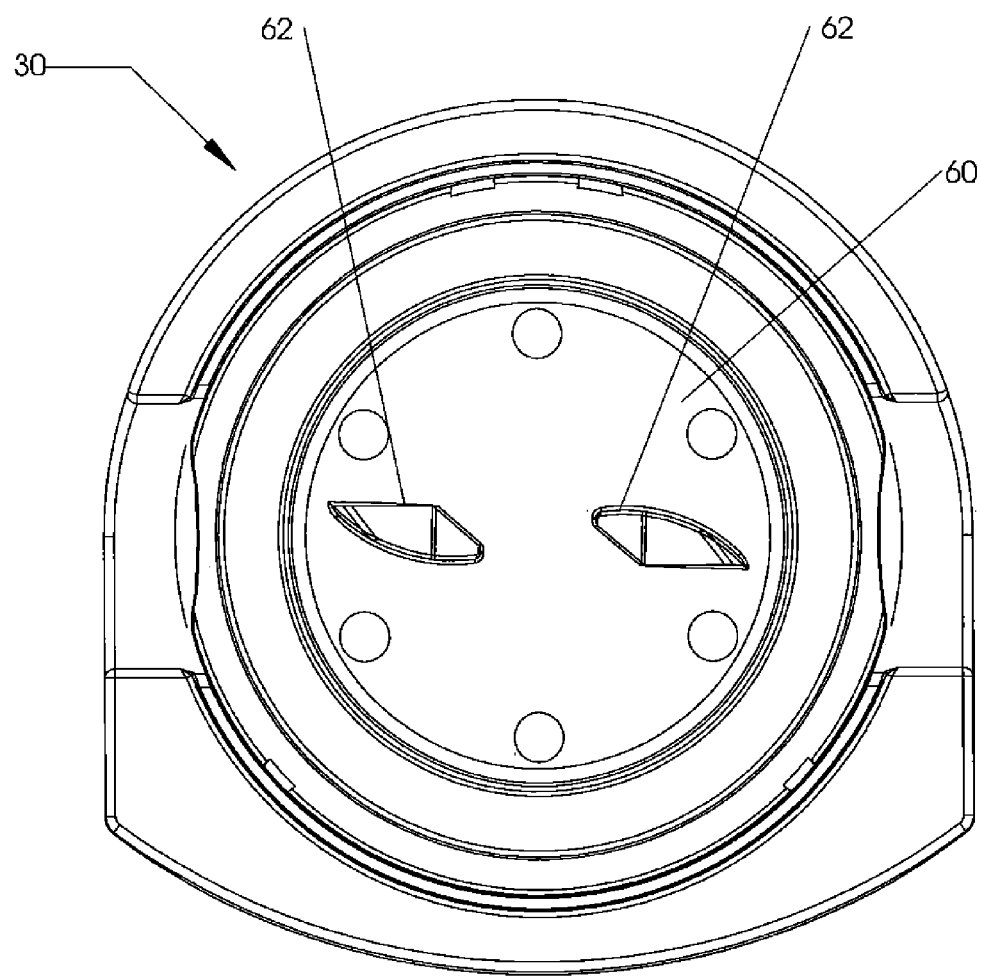
FIG. 7 is a top view of the FIG. 4 cupholder illustrating a complementary anti-rotational surface.
Figure 8:
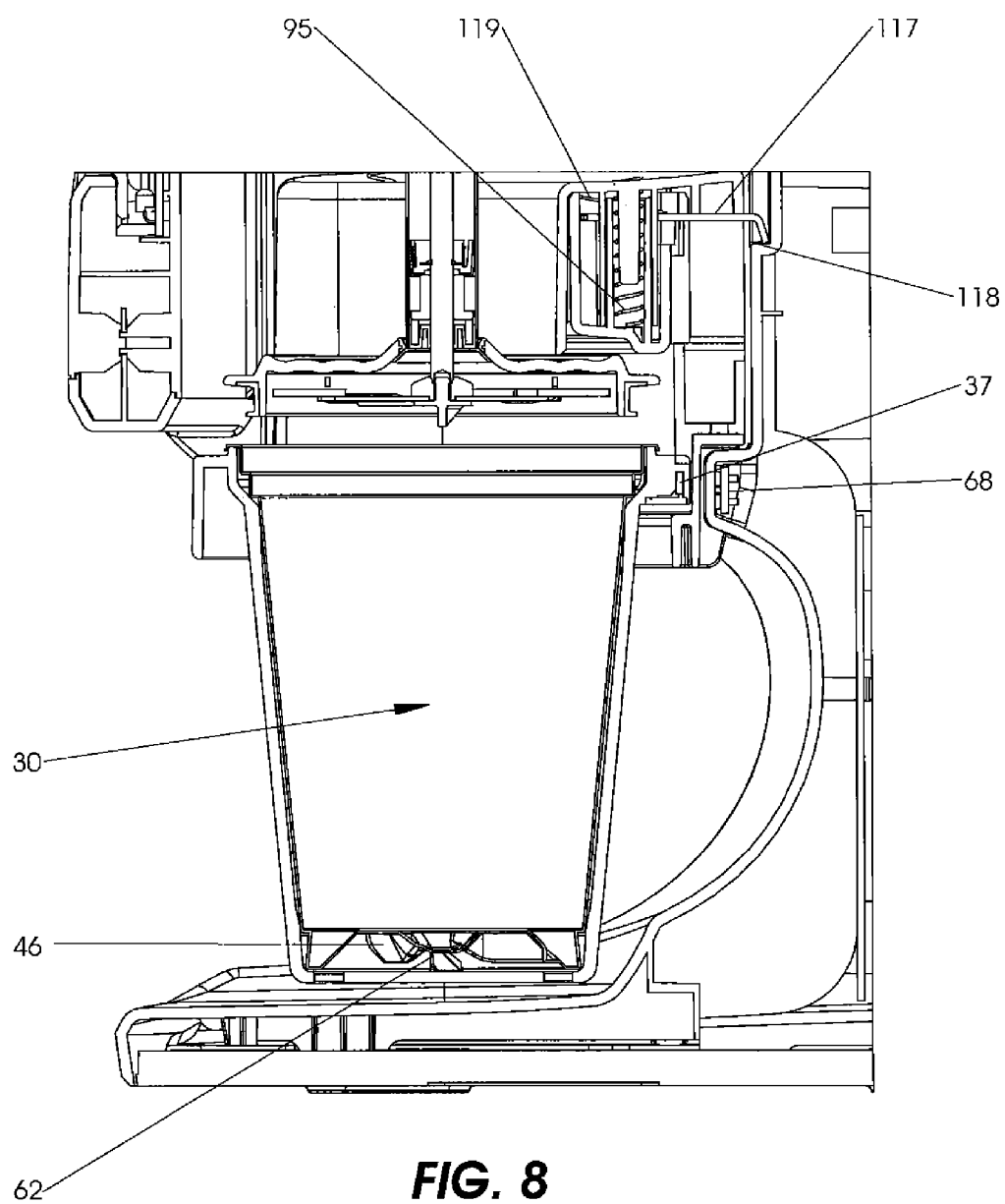
FIG. 8 is a side cross-section view of a preferred blender of the present invention illustrating proper initial positioning of the cupholder before blending.

FIG. 7 is a top view looking down into the base of the cupholder 30 and illustrating the complementary anti-rotational surface 60 of the cupholder 30. In a preferred embodiment, the anti-rotational surface 60 of the cupholder 30 also has vanes 62 of substantially triangular cross-section. As illustrated in FIG. 8, when the cup vanes 46 contact the cupholder vanes 62, the leading triangular apexes of the respective vanes 46, 62 will tend to deflect the vanes 46, 62 away from one another and cause gravity to fully drop the cup 40 into the cupholder 30. FIG. 8 illustrates how the anti-rotational surfaces 44, 60 of the cupholder 30 and cup 40 engage with one another so that their respective vanes 46, 62 intermesh on the same horizontal plane. After the vanes 46, 62 have intermeshed, those vanes 46, 62 prevent the cup and cupholder from rotating with respect to one another as the food or beverage product is being blended in the cup 40. Of course, in those embodiments where the food or beverage product is blended in the cupholder 30 without use of a cup 40, there would be no need for the complementary anti-rotational surfaces 44, 60.

In addition to showing complementary anti-rotational vanes 46, 62, FIG. 8 also shows how the cupholder's magnetic presence indicator 37 can interact with a cupholder presence sensor 68. If the cupholder presence sensor 68, for example, senses a strong enough magnetic field coming from magnetic presence indicator 37, it can send a signal to a microcontroller 140 (FIG. 27) in the blender indicating that the start button 24 should temporarily light up in the color green to indicate to the user that the blender can be activated for blending by pushing the start button 24. By contrast, if the cupholder presence sensor 68 fails to sense a strong enough magnetic field, it can send a signal or fail to send a signal to microcontroller 140 indicating that the start button 24 should not be activated. In addition to, or as an alternative to the magnetic presence sensor 68, other mechanical or electro-mechanical means, such as a switch, can be employed to determine whether the cupholder 30 is properly positioned so that the start button 24 can be activated.

FIGS. 9-13 illustrate the progression of steps involved in blending frozen food or beverage into, for example, a smoothie, milkshake or protein shake using the blender 10 of the present invention. To better understand how the blending machinery works, these steps are illustrated with the front housing door 20 in an open position. Nonetheless, as previously noted, the blending machinery, for safety reasons, should not be operated with the front housing door 20 open. As such, for purposes of understanding the operation of the blender 10 of the present invention, one should assume that the front housing door 20 would be closed when the steps in FIGS. 9-13 take place.

Figure 9:
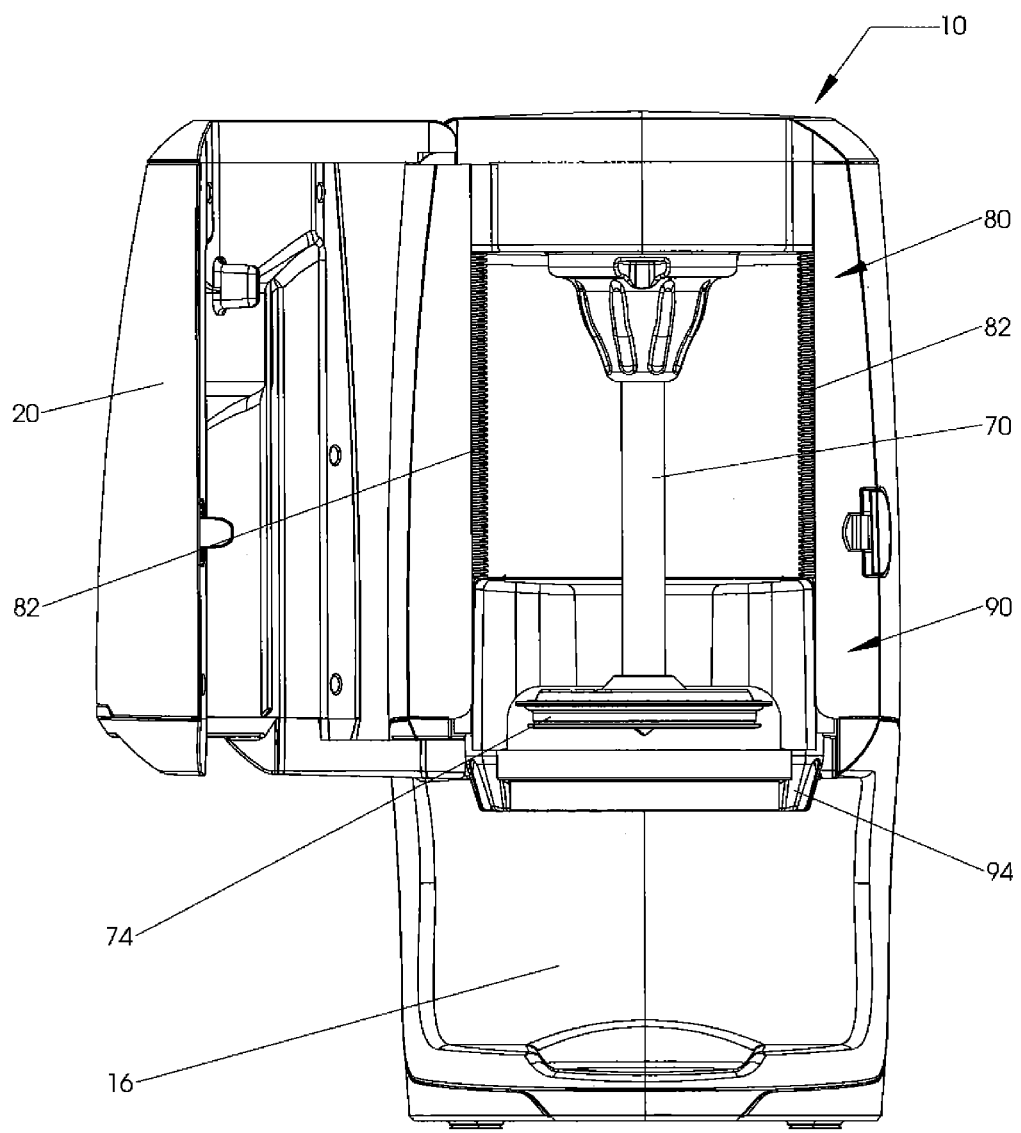
FIG. 9 is a frontal view of a preferred blender of the present invention with the front upper housing door open before insertion of a cupholder.
Figure 10:
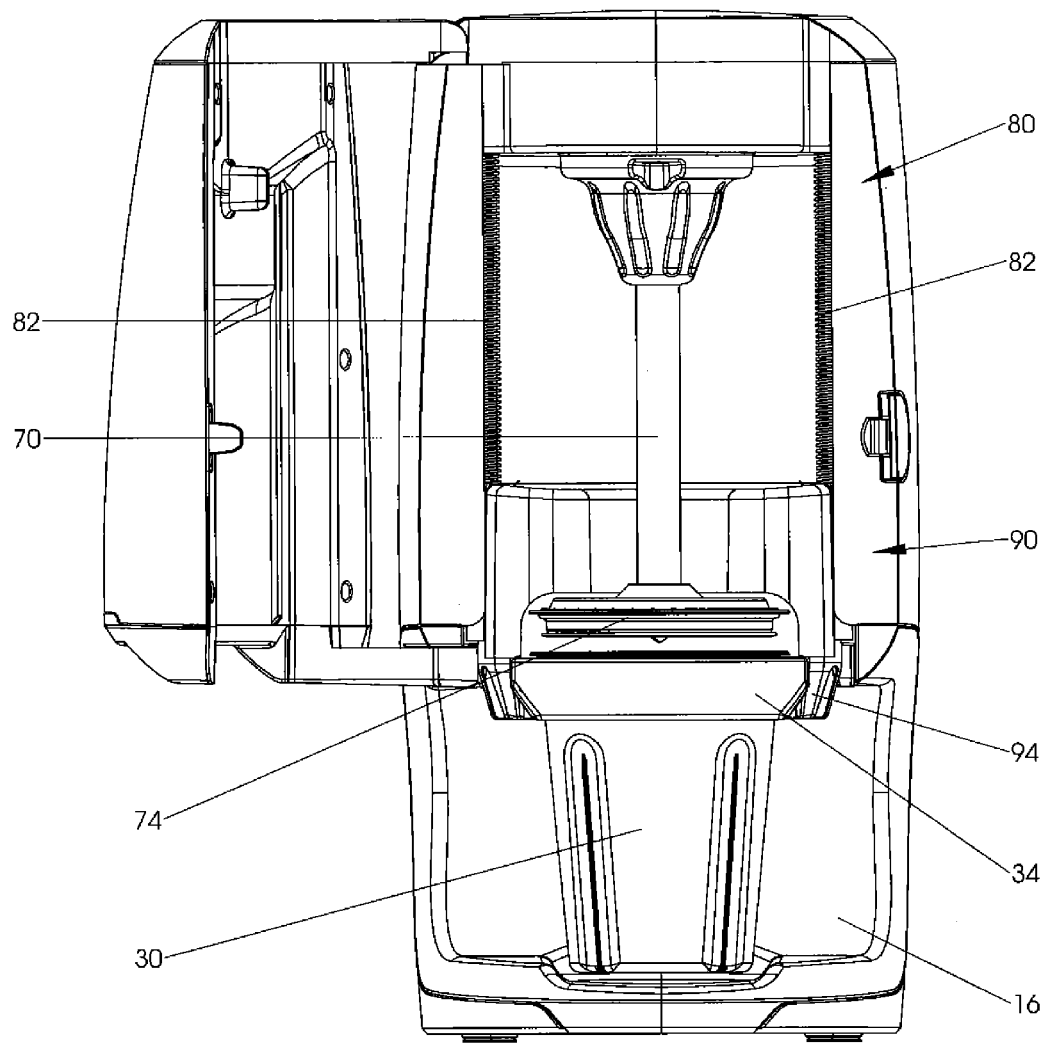
FIG. 10 is a frontal view of the preferred blender in FIG. 9 after a cupholder is inserted into the cupholder receiving area.

FIG. 9 illustrates how the elevator assembly 80 has its clamping jaw 90 and the spindle assembly 70 has its cup cover 74 in their lower most resting positions before the cupholder 30 is inserted into the cupholder receiving area 16 to begin the blending process. FIG. 10 illustrates the next step of having the user insert the cupholder 30, preferably including a cup 40 having frozen food or beverage, into the cupholder receiving area 16. The cupholder 30 should be inserted so that the upper lip 34 of the cupholder rests within the lower clamping jaw 94 of the elevator assembly 80. At this point in the process, there has not yet been any motorized movement of the blender 10.

Figure 11:
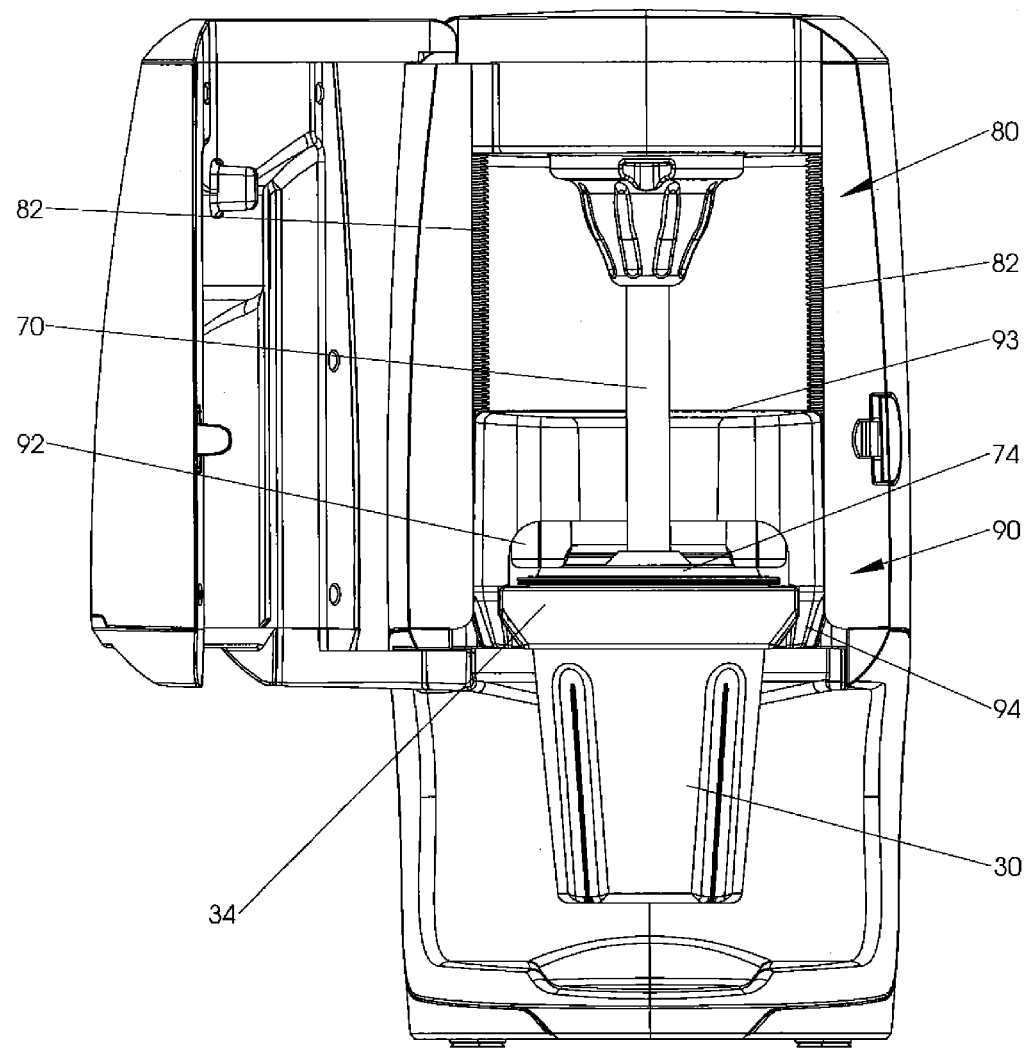
FIG. 11 is a frontal view of the preferred blender in FIG. 9 after the clamping jaw presses the spindle cup cover against the top of the cup.

FIG. 11 illustrates the beginning step of motorized blending. After the start button 24 is pushed to begin activation of the blender 10, the elevator assembly 80 pulls the lower clamping jaw 94 upward using its motorized dual lead screws 82 to the point where the lower 94 and upper 92 clamping jaws come together to firmly secure the cupholder 30 and clamp the cup cover 74 of the spindle assembly 70 against the top of the cup 40 to prevent food or beverage from spilling out during blending.

Figure 12:
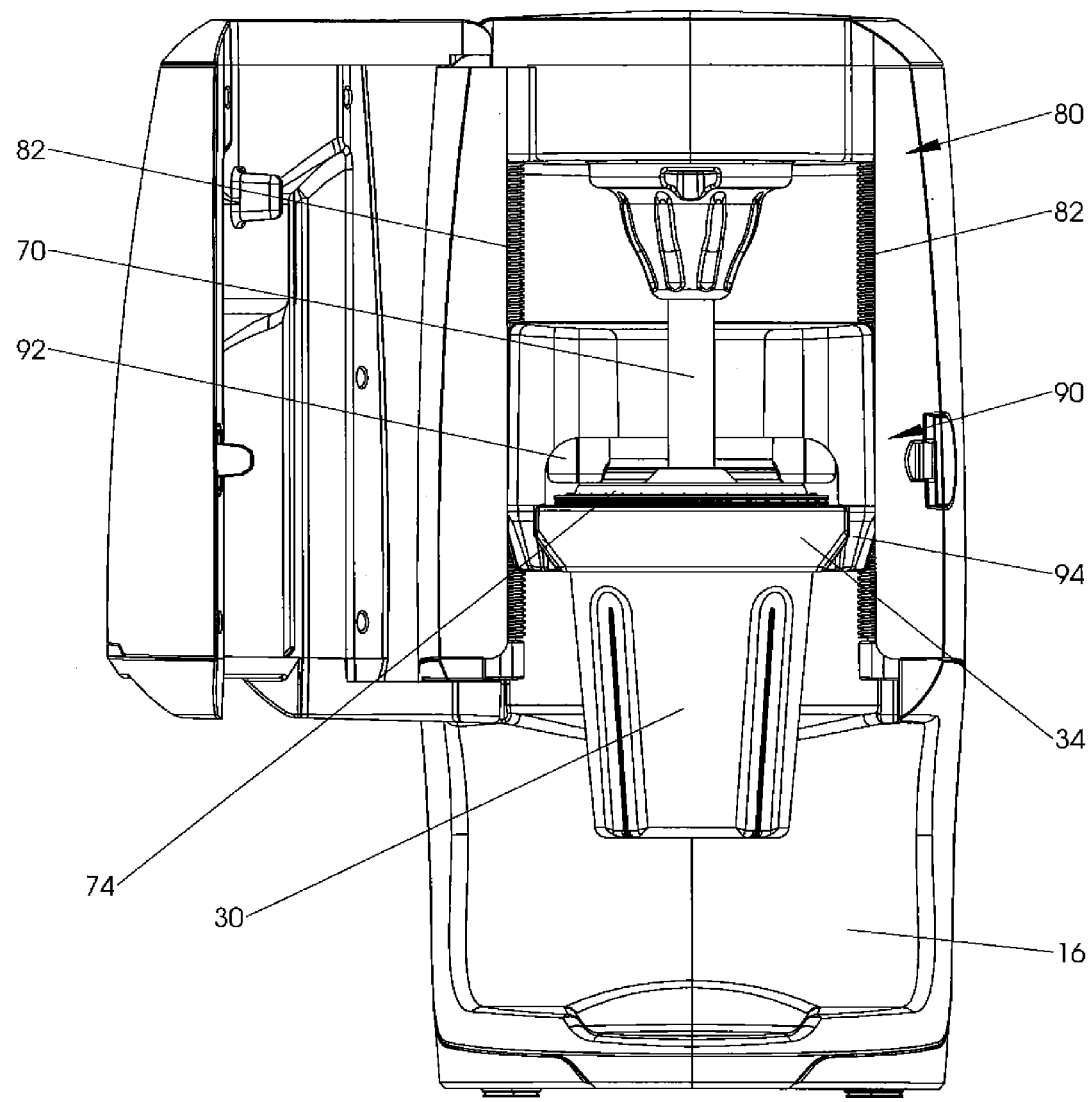
FIG. 12 is a frontal view of the preferred blender in FIG. 9 as the dual lead screws in the elevator assembly lifts the cupholder during blending.
Figure 13:
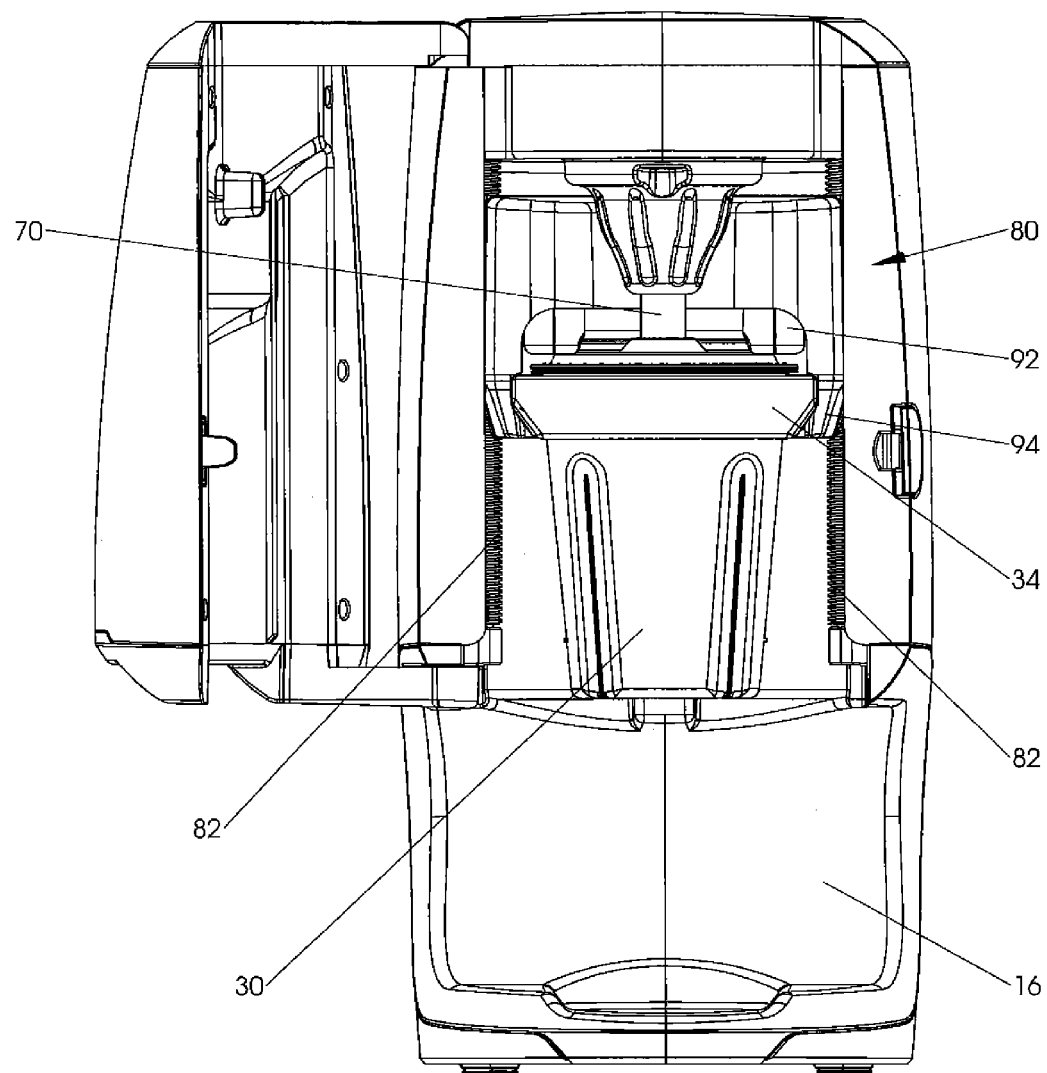
FIG. 13 is a frontal view of the preferred blender in FIG. 9 as the cupholder reaches its maximum height during blending.

In FIG. 12, blending of the food or beverage product is taking place. At the bottom of the spindle assembly (FIG. 15), there are preferably rotating cutting blades 72 that are used to cut through and blend the food or beverage product. While rotating cutting blades 72 are the preferred blending tool for the present invention, particularly where the food or beverage to be blended is frozen, those of skill in the art will recognize that other blending tools, such as whisks, may also be used in appropriate circumstances. In the preferred blender 10 of the present invention, the rotating cutting blades 72 remain at a constant, predetermined height while the cupholder 30 moves up and down. As the elevator assembly 80 moves the cupholder 30 up and down, the rotating cutter blades 72 operate at different levels of the food or beverage product. For example, in the position shown in FIG. 12, the rotating cutting blades 72 would be blending at a level which is one quarter to one half of the way down through the food or beverage in the cup 40 or cupholder 30. To achieve even blending and good consistency, the rotating cutting blades 72 should work at all levels of the food or beverage present in the cup 40 or cupholder 30. FIG. 13 illustrates what happens when the elevator assembly 80 raises the cupholder 30 to its highest point. When the cupholder 30 reaches its highest point, the rotating cutting blades will be spinning at or near the bottom of the cup 40 or cupholder 30.

Figure 14:
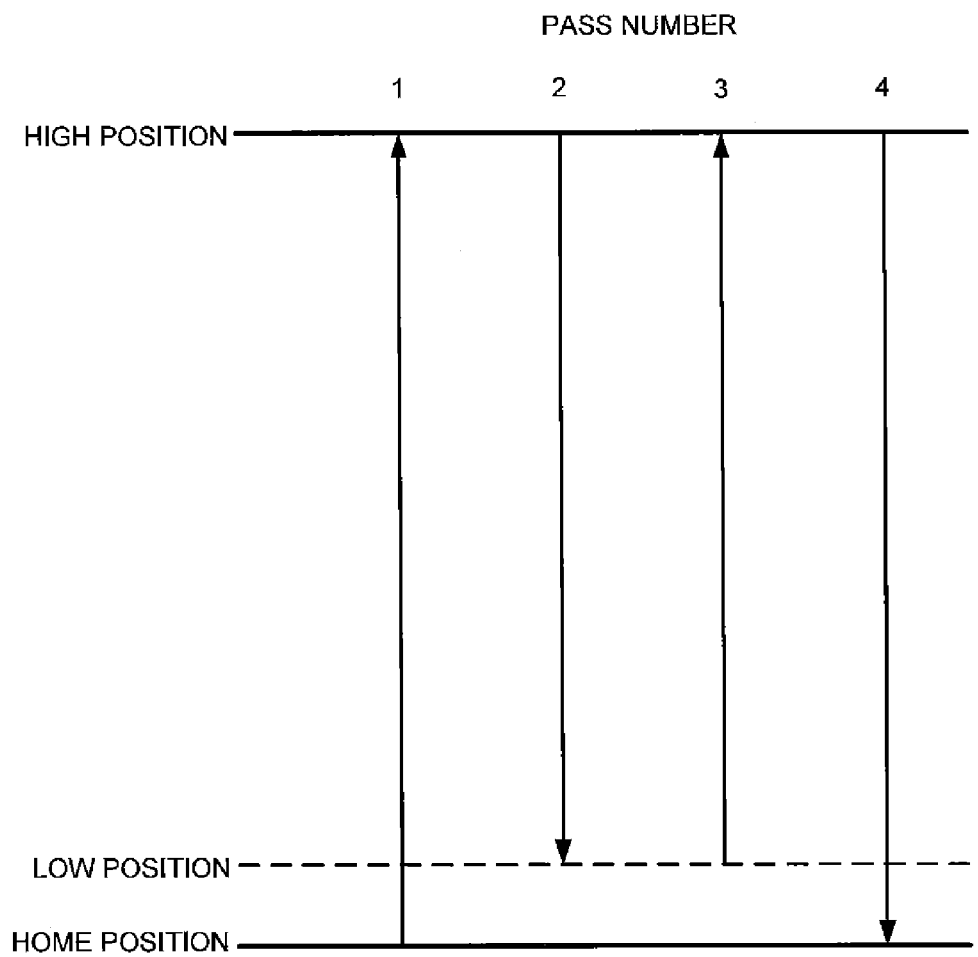
FIG. 14 is a chart conceptually illustrating how the cupholder is moved up and down during blending.

When the cupholder 30 is subsequently lowered, the progression of steps is the opposite of those shown in FIGS. 9-13. In other words, the cupholder 30 begins at the highest level as shown in FIG. 13 and gradually is lowered to the positions shown in FIG. 12, FIG. 11 and then FIG. 10. To get the best blending and consistency, the cupholder 30 is preferably raised and lowered multiple times while the rotating cutting blades 72 are spinning and before the cupholder 30 is released from the clamping jaw 90 as shown in FIG. 10. FIG. 14 illustrates one such multiple pass protocol. In the FIG. 14 protocol, the cupholder 30 is raised and lowered twice by the elevator assembly 80 before the cupholder 30 is released in the resting or "home position". In the FIG. 14 embodiment, the "home position" corresponds to the cupholder position illustrated in FIG. 10, the "low position" corresponds to the cupholder position illustrated in FIG. 11 and the "high position" corresponds to the cupholder position illustrated in FIG. 13.

Figure 15:
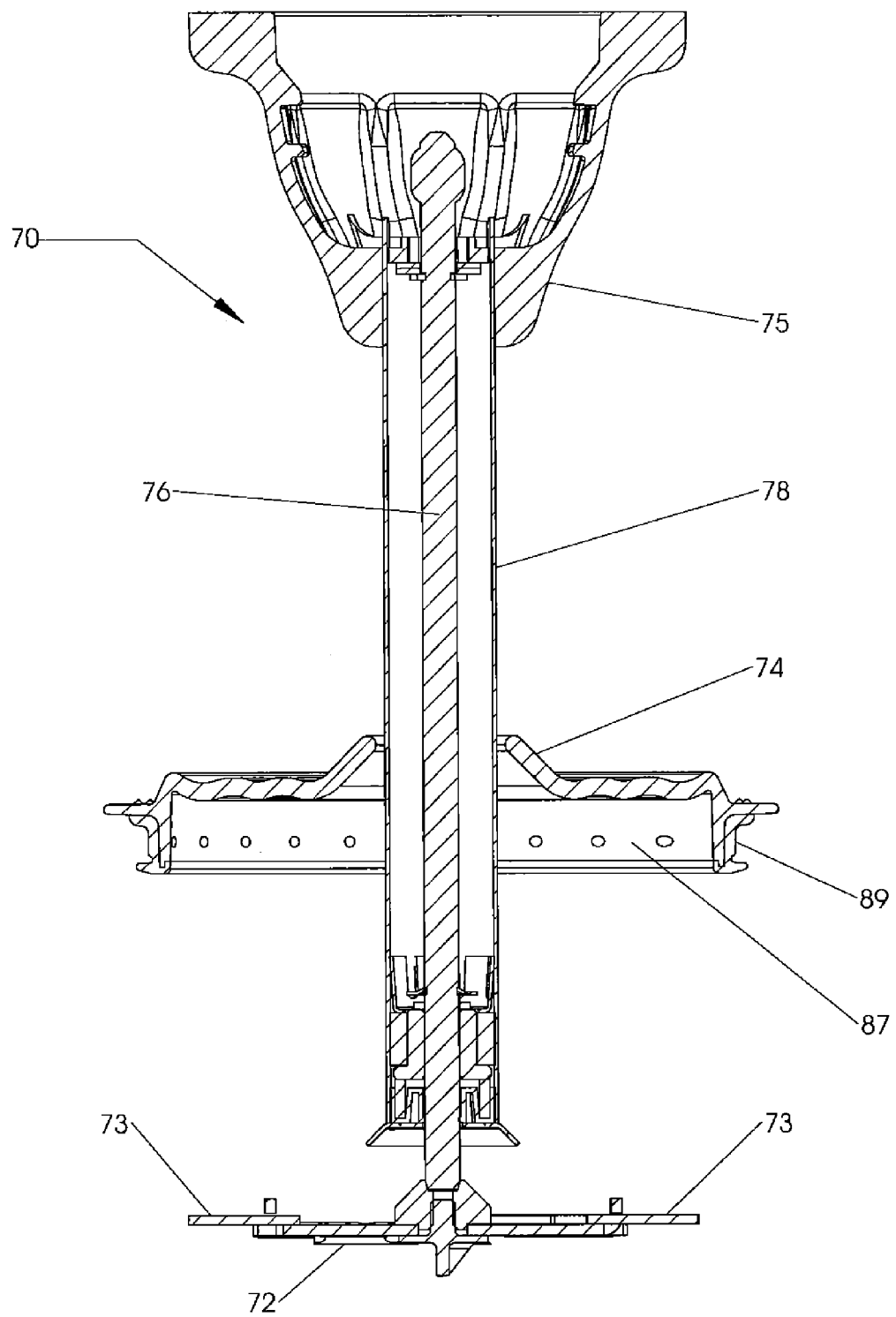
FIG. 15 is a cross-section view of a preferred spindle assembly of the present invention.
Figure 25:
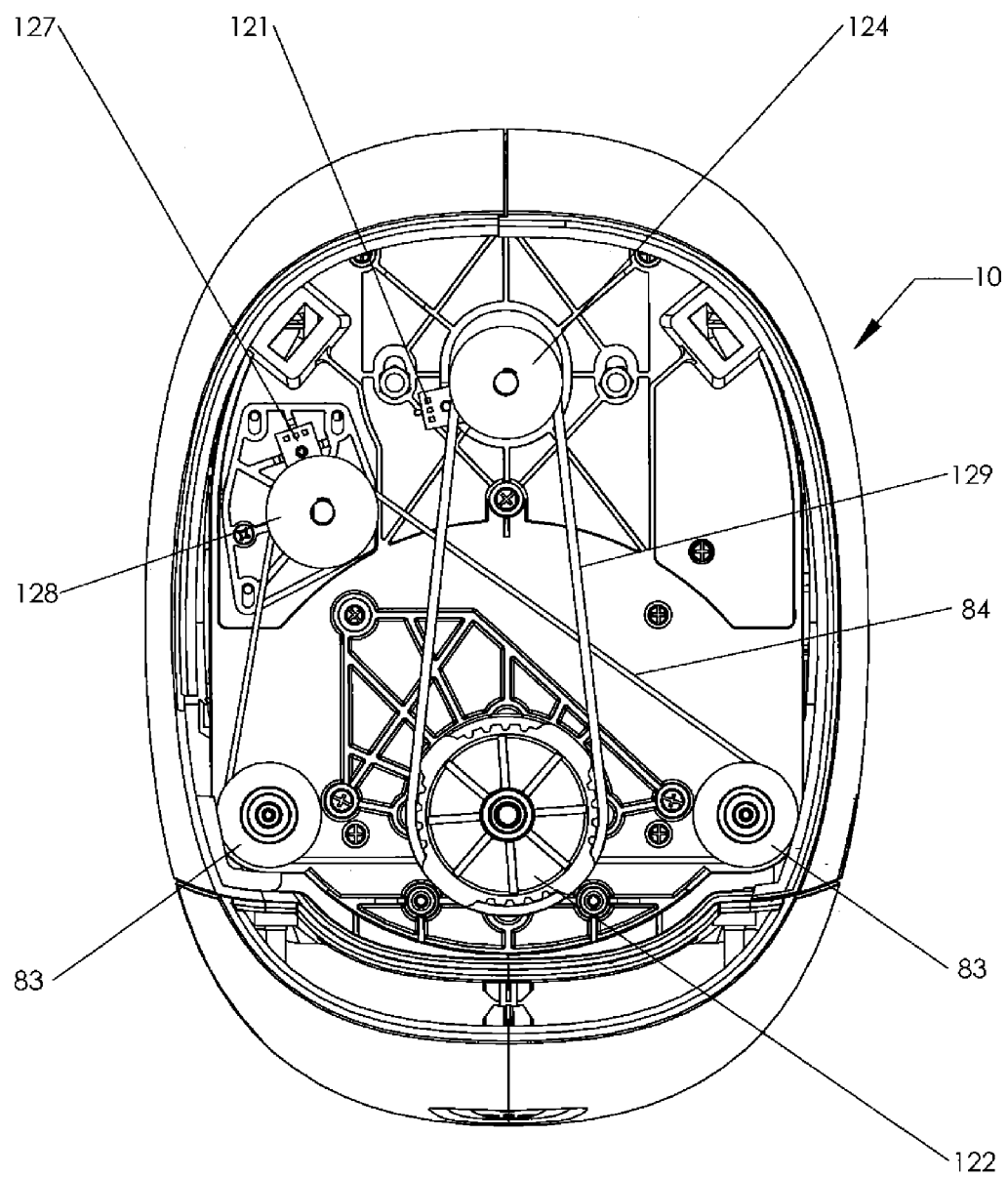
FIG. 25 is a top view of the belts and pulleys that connect the spindle and dual lead screw motors to the spindle and lead screws.
Figure 26:
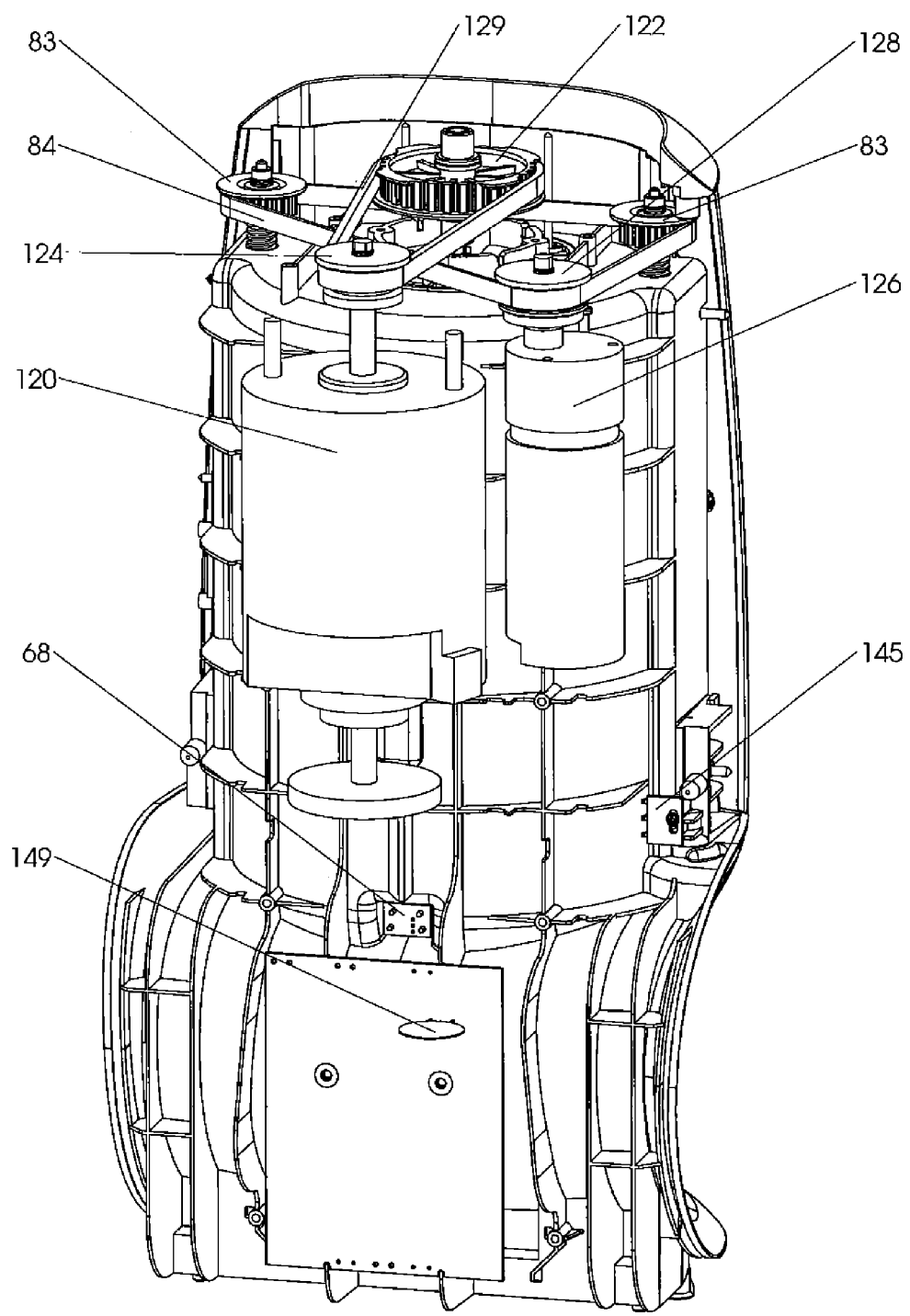
FIG. 26 is a rear view of the spindle and lead screw motors as well as their belts and pulleys.

FIG. 15 shows a cross-section view of the preferred spindle assembly 70 of the present invention. The spindle assembly 70 preferably includes a quick release coupling member 75, a rotating shaft 76, cup cover 74 and rotating cutting blades 72. The quick release coupling member 75 connects the spindle assembly 70 to a spindle pulley 122 (FIG. 25-26). To facilitate cleaning of the spindle assembly 70, the quick release coupling member 75 allows the spindle assembly 70 to be quickly detached from the blender 10 as illustrated in FIGS. 17-20. Rotating motion generated by the spindle motor 120 (FIG. 26) is translated to the rotating cutting blades 72 through the rotating shaft 76 of the spindle assembly 70. The rotating shaft 76 is preferably housed in an outer sleeve 78 for structural/alignment purposes and to keep the shaft free from food/beverage particles. Slidably attached to the outside of the outer sleeve 78 and trapped between the quick release coupling member 75 and the rotating cutting blades 72 is a moveable cup cover 74. The purpose of the cup cover 74 in the preferred embodiment is to press onto the top lip 41 of the cup 40 in order to prevent food or beverage from spilling out of the cup 40 or cupholder 30 during blending. The cup cover 74 is preferably constructed from a combination of a hard plastic base 87 and a soft plastic or rubber seal 89. The hard plastic base 87 maintains a resilient shape for the cup cover 74 while the soft plastic or rubber seal 89 makes a tight, flexible fit with the top of the cup 40. Alternatively, the cup cover 74 can be molded from a single plastic to reduce costs. As illustrated in FIGS. 11-13, the cup cover 74 is clamped to the top of the cup 40 by the clamping jaw 90 before blending and moves up and down the outer sleeve 78 of the spindle assembly 70 with the clamping jaw 90 during blending.

At the bottom of the spindle assembly 70 are the rotating cutting blades 72. The purpose of the rotating cutting blades 72 is to cut through the food or beverage during blending, particularly if they are frozen. While most of the non-electrical parts of the blender 10 of the present invention are preferably made from plastic, the rotating cutting blades 72 are preferably made from a rust proof metal, such as stainless steel. In the preferred embodiment, the rotating cutting blades 72 include radially extendable cutting blades 73 (see also, FIG. 21). One embodiment of these radially extendable cutting blades 73 is disclosed in U.S. Pat. No. 6,527,207, the disclosure of which is hereby incorporated by reference. The purpose of the radially extendable cutting blades 73 is to compliment the rotating cutting blades 72 by adjusting to sections of the cup 40 or cupholder 30 with different radiuses. For example, most cups are not perfectly cylindrical, but rather have a larger radius at their top than at their bottom. The cup 40 illustrated in FIG. 5 shows a cup with this sort of varying radius. By having radially extendable cutting blades 73 complimenting the rotating cutting blades 72, the radially extendable cutting blades 73 can extend their blending radius to the edge of the cup 40 even though that radius changes from the top of the cup to the bottom of the cup.

Figure 16:
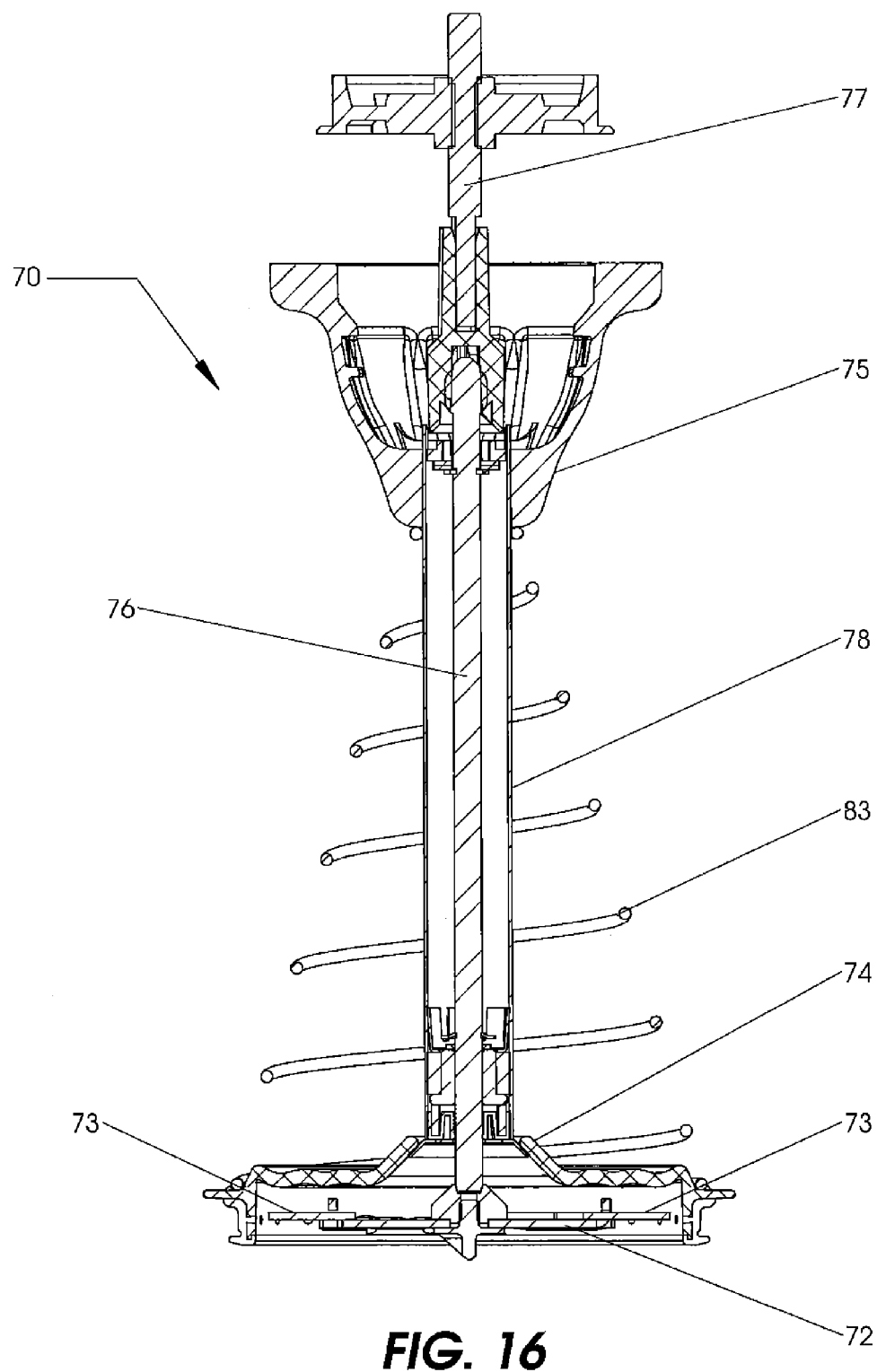
FIG. 16 is a cross-section view of an alternative spindle assembly embodiment of the present invention.

FIG. 16 shows an alternative embodiment for the spindle assembly 70 of the present invention which further includes a spindle assembly spring 83 and illustrates a spindle connector 77 which connects the rotating shaft 76 of the spindle assembly to the spindle assembly pulley 122. The spindle assembly spring 83 is useful for pressing the cup cover 74 against the top of the cup 40 in those embodiments, for example, that do not have a clamping jaw 90 to perform that function (see, e.g., FIG. 30). The disadvantage of this spindle spring 83 embodiment, as compared with the preferred clamping jaw 90 embodiment, is that, in the alternative spindle spring embodiment 83, the spring 83 will compress as the cup cover 74 and cupholder 30 are raised during blending thereby creating a variable load on the dual lead screw motor 126 (FIG. 26) as compared with a more constant load that the clamping jaw 90 creates.

Figure 17:
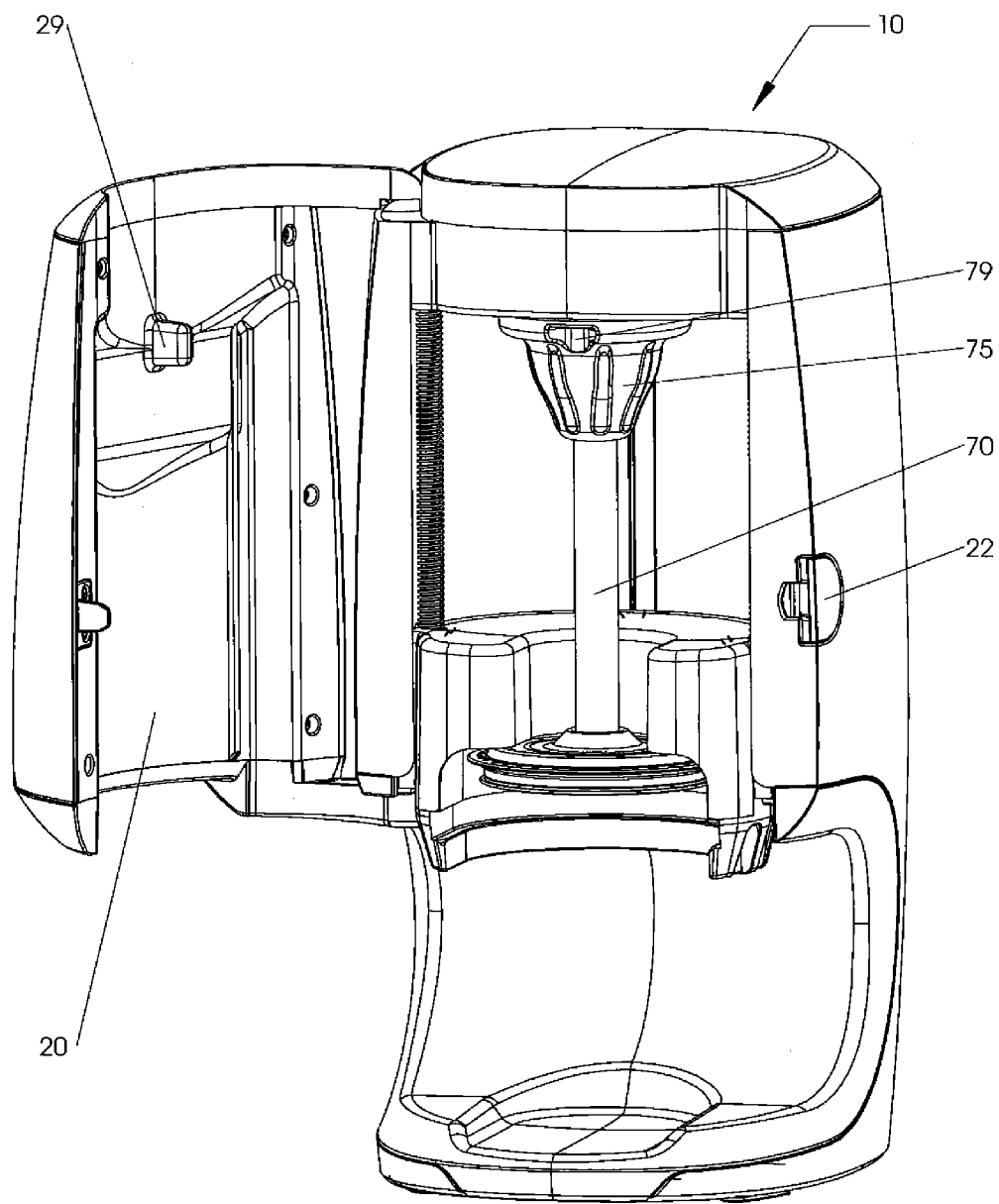
FIG. 17 is a perspective view of the preferred blender in FIG. 9 illustrating the spindle assembly in its locked position.

FIGS. 17-20 illustrate how the spindle assembly can be quickly and easily removed from the blender 10 of the present invention for periodic cleaning. To begin the removal process, one must first open the front housing door 20 by unfastening the front door latch 22. FIG. 17 illustrates the spindle assembly 70 in its locked, operational position after the front housing door 20 has been opened. To make sure the spindle assembly 70 is in a proper locked, operational position before blending, the preferred blender 10 of the present invention uses a combination of a peg 29 on the front housing door 20 and a complementary opening 79 on the quick release coupling member 75 of the spindle assembly 70. In order for the front housing door 20 to close, the peg 29 must fit into its complementary spindle assembly opening 79. If the peg 29 and opening 79 are not properly aligned, the front housing door 20 will not close due to the interference of peg 29 with the surfaces adjacent to opening 79. Alternatively, as those of skill in the art will recognize, the parts can be reversed so that the peg is on the spindle assembly 70 and the opening is on the front housing door 20. As previously noted, if the front housing door 20 is not closed, the blender 10 will preferably be prevented from operating.

Figure 18:
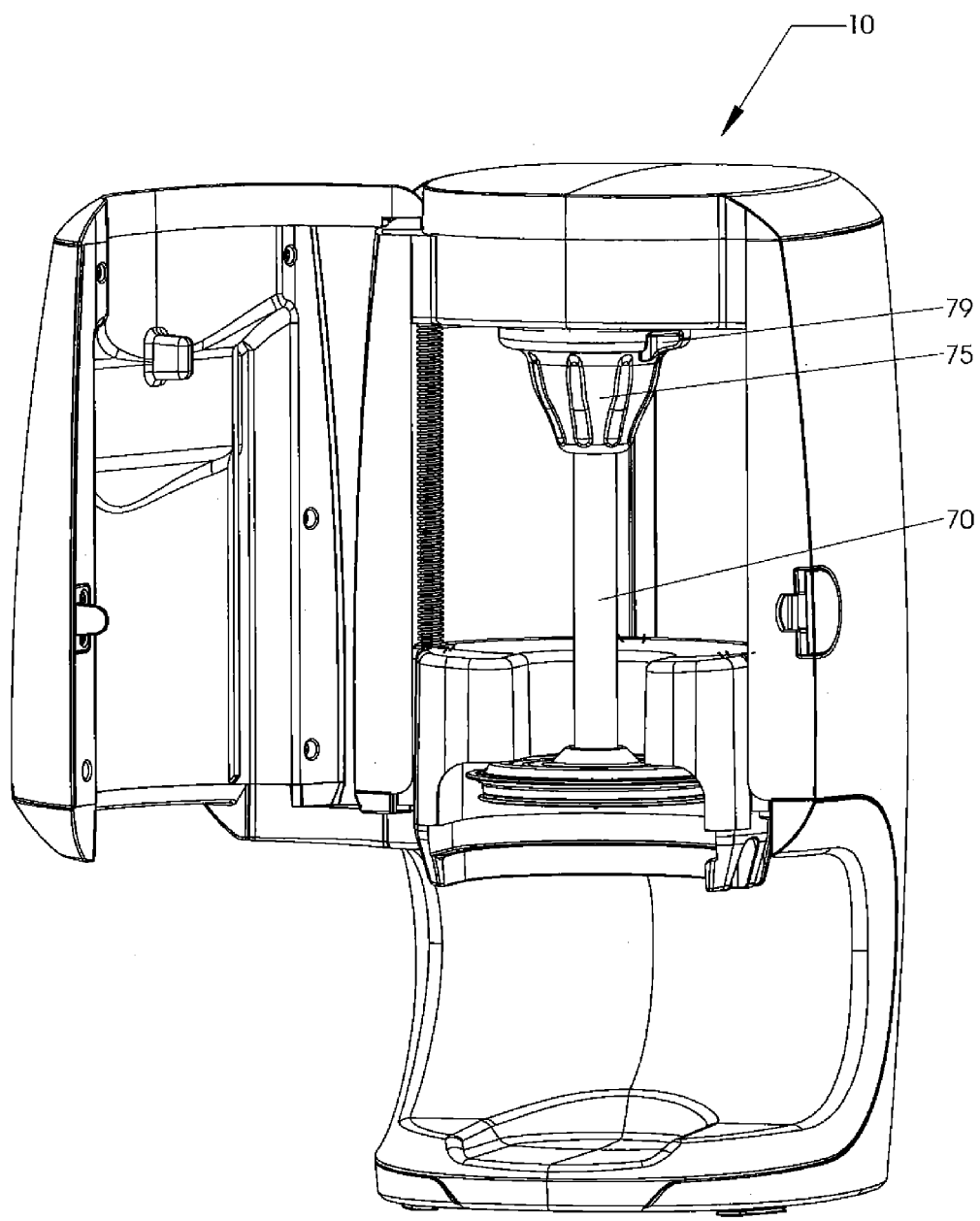
FIG. 18 is a perspective view of the preferred blender in FIG. 9 illustrating how the spindle assembly can be turned to an unlocked position.
Figure 19:
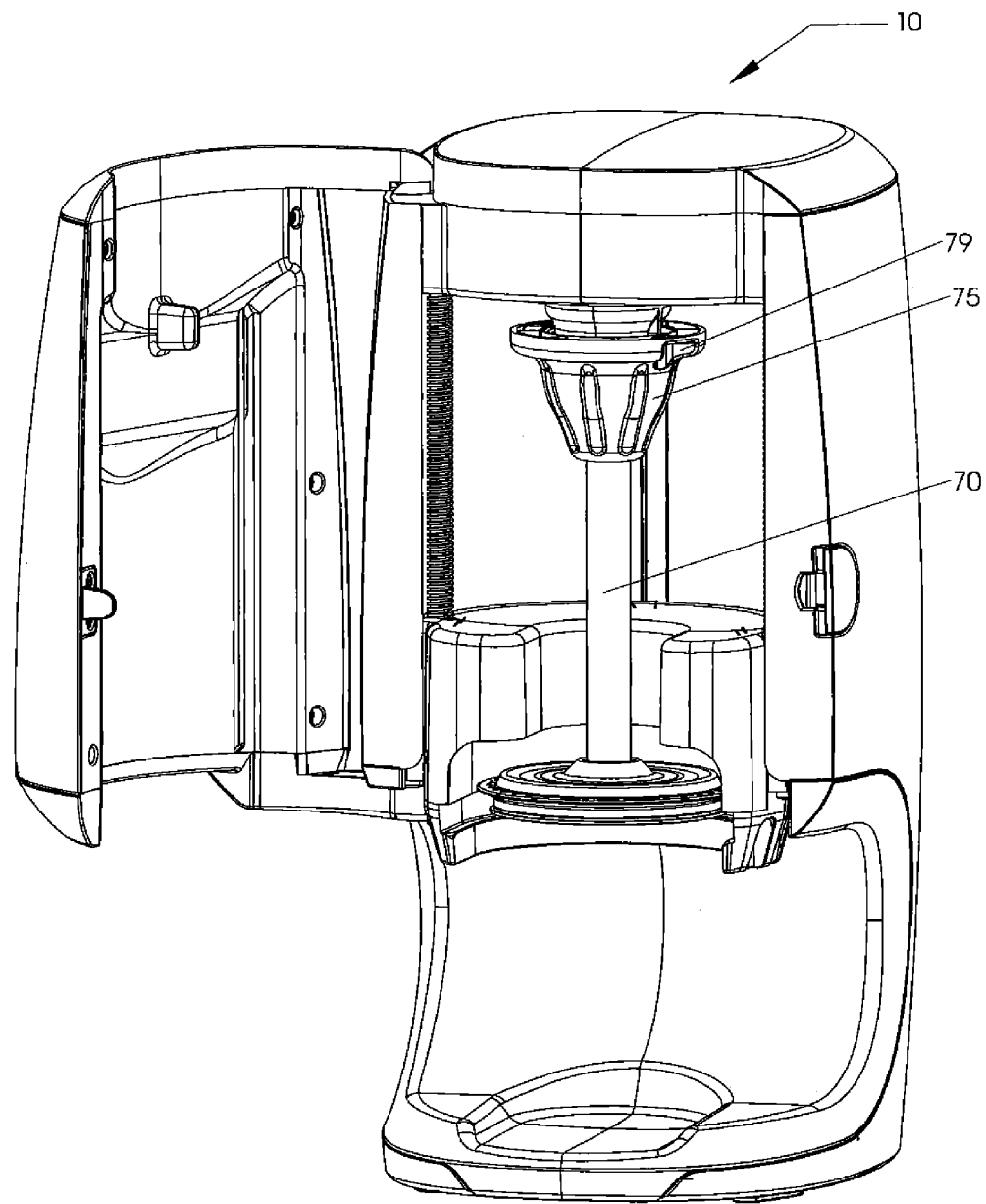
FIG. 19 is a perspective view of the preferred blender in FIG. 9 illustrating how the spindle assembly can be pulled down for removal and cleaning after it is turned to an unlocked position.
Figure 20:
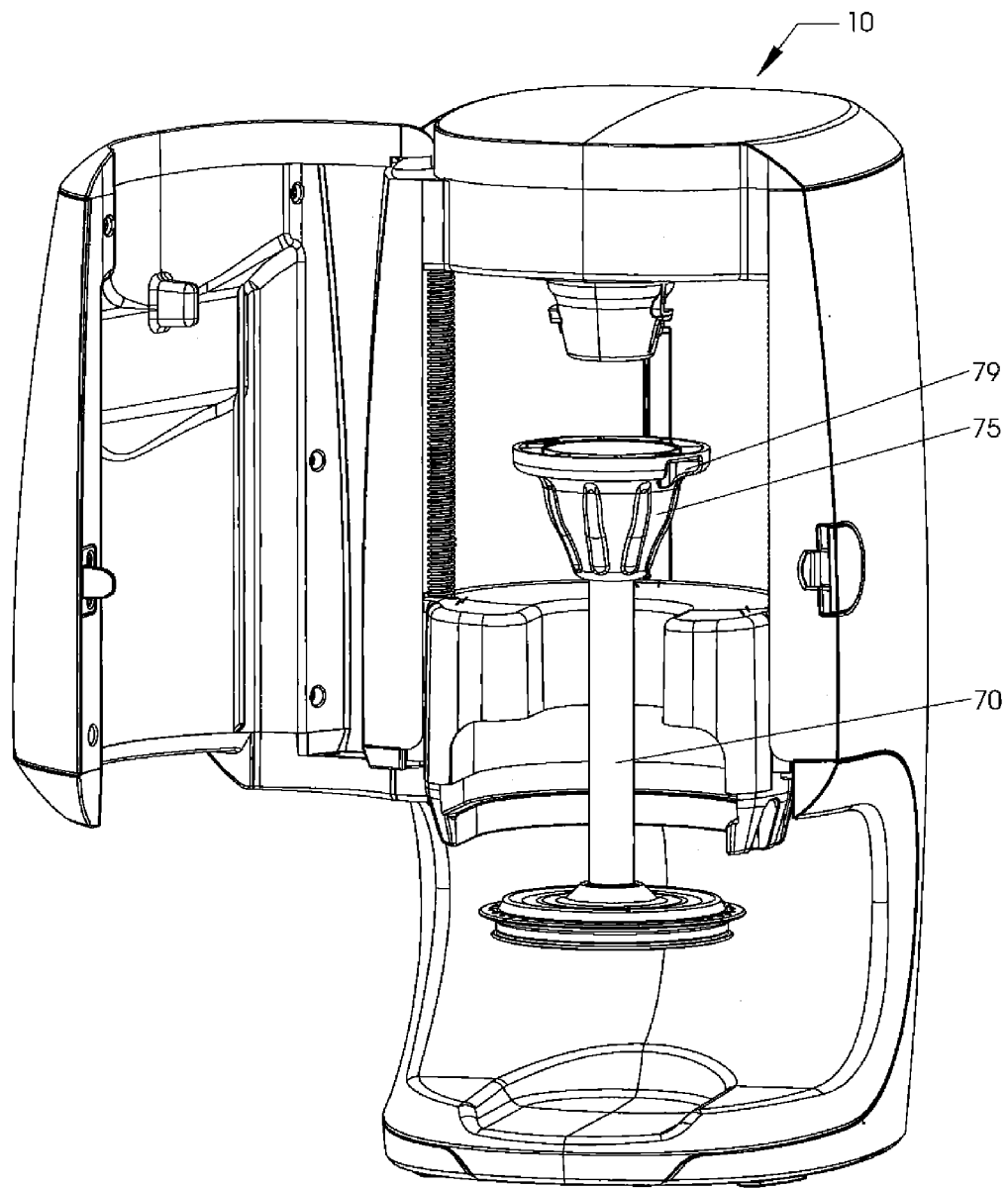
FIG. 20 is a perspective view of the preferred blender in FIG. 9 illustrating removal of the spindle assembly from the blender.

As shown in FIG. 18, removal of the spindle assembly 70 from the blender 10 requires, in the preferred embodiment, that the quick release coupling member 75 be turned to the right to place it in an unlocked position. As shown in FIG. 19, after the quick release coupling member 75 is in an unlocked position, it can be pulled down to detach the spindle assembly 70 from the rest of the blender 10. Finally, as shown in FIG. 20, the spindle assembly 70 can be pulled away altogether from the blender 10 to allow it to be cleaned. Reattaching the spindle assembly 70 to the blender after it has been cleaned is simply a matter of repeating the steps shown in FIGS. 18-20 in reverse order. While one mechanism for removing the spindle assembly 70 from the blender has been illustrated, those of skill in the art will recognize that other mechanisms can be used to remove the spindle assembly 70 from the blender 10.

Figure 21:
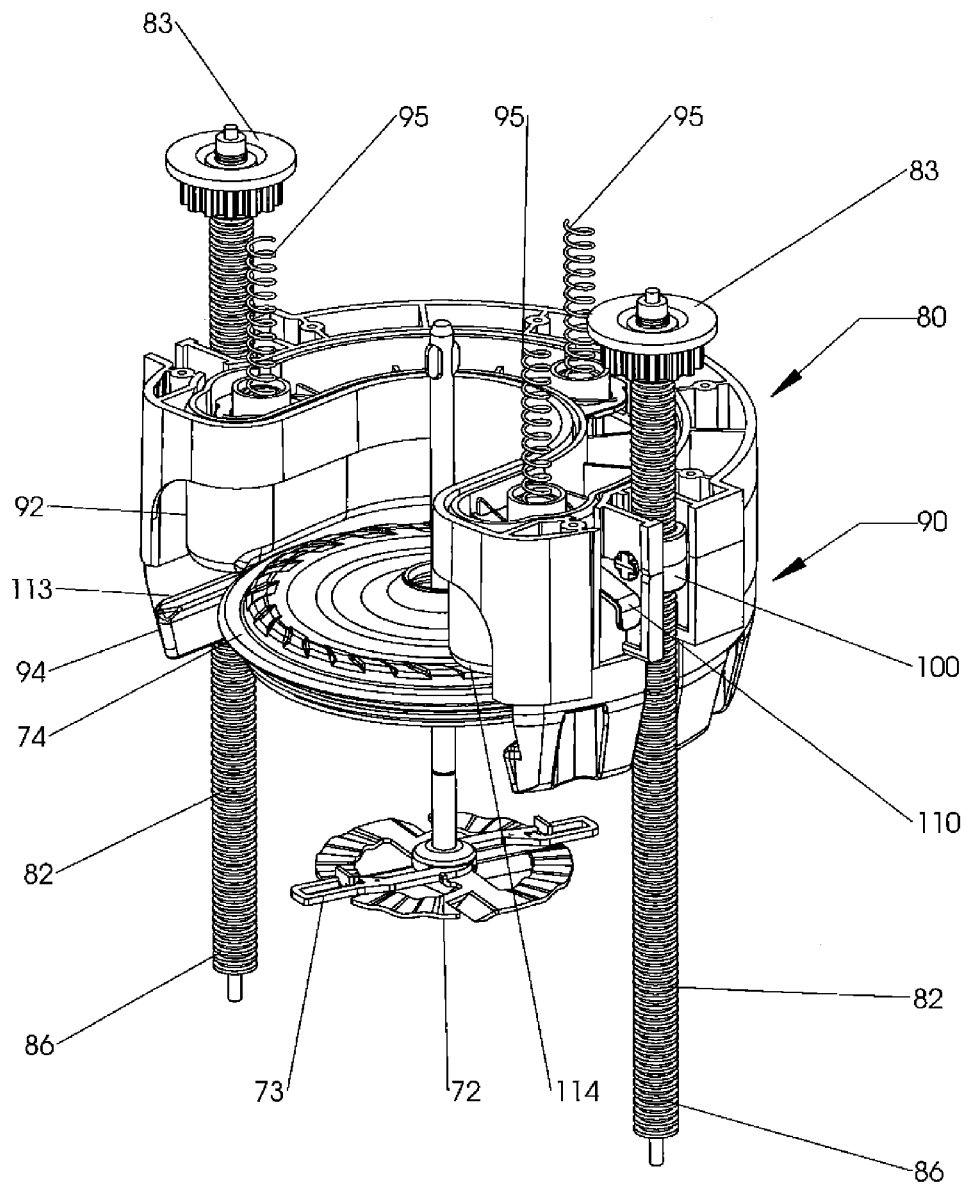
FIG. 21 is a section view of a portion of the elevator assembly, including the clamping jaw.

FIG. 21 shows a cut away, section view of the elevator assembly 80. In its preferred form, this elevator assembly 80 includes clamping jaw 90, dual lead screws 82, clamping jaw drive nuts 100, clamping jaw springs 95 and a clamping jaw lever lock mechanism 110. The clamping jaw 90 includes upper clamping jaw 92 and lower clamping jaw 94. As can be most clearly seen in FIG. 21, the "upper" clamping jaw 92 is actually a U-shaped part that fits into a U-shaped annular space in "lower" clamping jaw 94. While part of lower clamping jaw 94 is physically lower than the upper clamping jaw 92, there is also a portion of lower clamping jaw 94 that wraps around the outside of upper clamping jaw 92 at the same height as upper clamping jaw 92. The purpose of upper 92 and lower 94 clamping jaws is to collectively clamp onto the upper lip 34 of the cupholder 30 using opposing surfaces 113, 114 and press the cup cover 74 of the spindle assembly 70 against that upper lip 41 of the cup 40 (see also, FIG. 11). This clamping action is aided by clamping jaw springs 95 which continually bias the upper clamping jaw 92 downward. Once the cupholder 30 is firmly secured by the clamping jaw 90 and the cup 40 is covered, the clamping jaw 90 can raise and lower the cupholder 30 during the blending process through the actions of the dual lead screws 82.

Figure 21A:
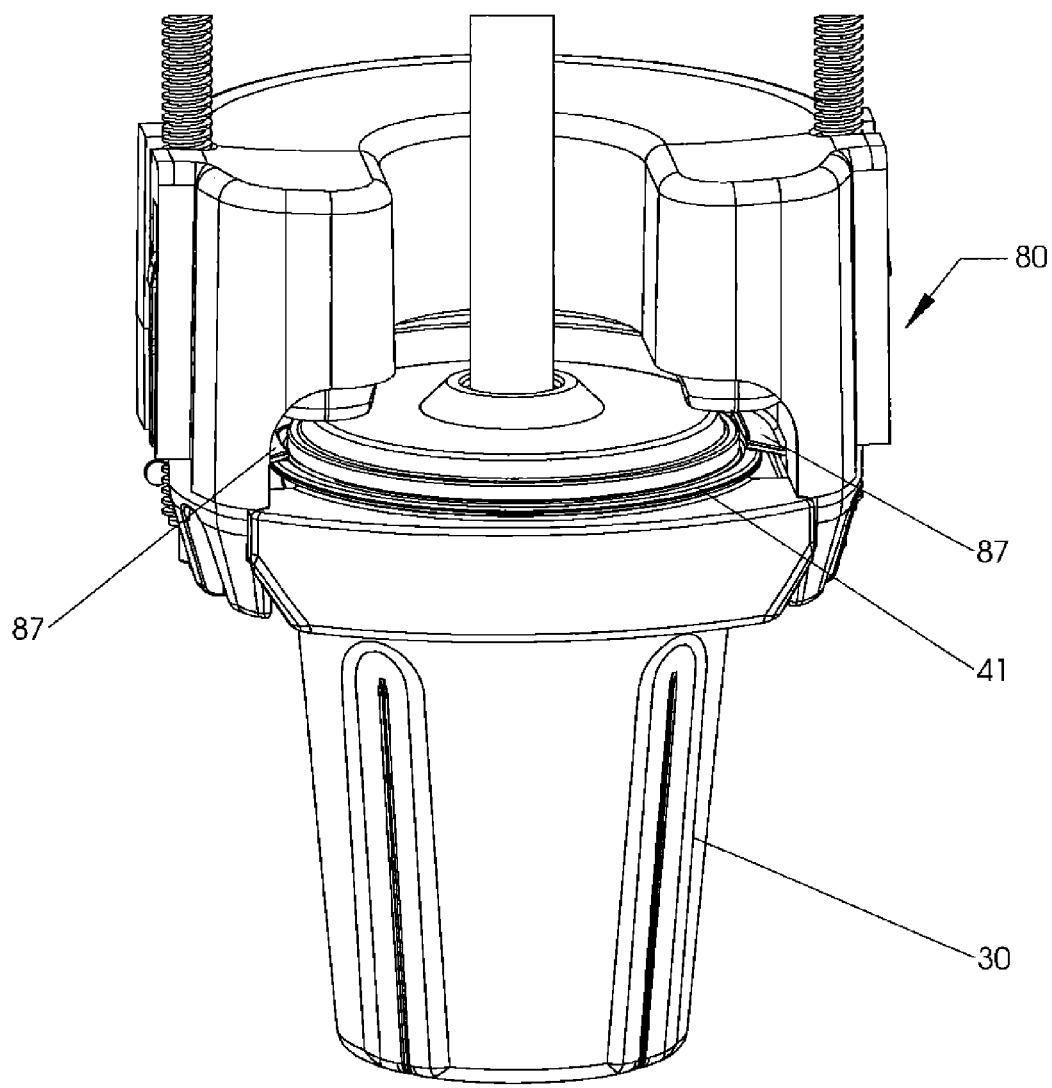
FIG. 21A is a front view of an alternative embodiment for a portion of the elevator assembly.

FIG. 21A shows a slightly modified form of the FIG. 20 elevator assembly 80. In the FIG. 21A embodiment, wings 87 are attached to the lower clamping jaw 94 in such a way that they will vertically constrain the cup lip 41 during blender operation so that the cup 40 will stay in the cupholder 30. If the rubber seal 89 of the cup cover 74 fits tightly to the cup lip 41, it can cause the cup cover 74 to stick to the cup 40. Consequently, when the blending process is finished and the lower clamping jaw 94 is returned to the "home position", the cup cover 74 may cause the cup 40 to be pulled out of the cupholder 30. If so, it will be more difficult for the user to remove the cupholder 30 and cup 40 from the blender 10 once the blending process is finished. The wings 87 in the FIG. 21A embodiment vertically constrain the cup lip 41 in such a way that the cup lip 41 will separate from the cup cover 74 when the lower clamping jaw 94 is returned to the "home position" and, thus, the cup 40 and cupholder 30 will always remain together while they are in the blender.

Returning to FIG. 21, using dual lead screws 82 is the preferred way to raise and lower the cupholder 30 in the blender 10 of the present invention. If only a single lead screw were used on one side of the clamping jaw 90, cantilevered loads with resulting moments and torque would be created on the opposing side of the clamping jaw 90 by the pull of gravity and by the resistance of the product being blended by the blender 10. This torque would not only lead to greater wear on the elevator assembly 80 but could cause the elevator assembly 80 to jam or break and, for that reason, a single lead screw is not preferred. By using a lead screw 82 on each side of the clamping jaw 90 turning at the same rate, the clamping jaw 90 is raised and lowered without significant cantilevered moments. Using at least two lead screws allows for reliable operation and a longer life for the blender 10 of the present invention. To have the dual lead screws 82 turn at the same rate, the dual lead screws 82 are preferably connected to the same motor 126 (FIG. 26). In the preferred embodiment, pulleys 83 of the top of each lead screw 82 are connected to each other and the dual lead screw motor 126 through a common belt or chain 84 (FIG. 25). As the dual lead screw motor 126 turns, the pulleys 83 on each lead screw 82 are turned at the same rate. As those of skill in the art will recognize, the movement of the dual lead screws 82 can alternatively be synchronized through the use of gears (not shown) rather than a belt or chain 84.

Figure 22:
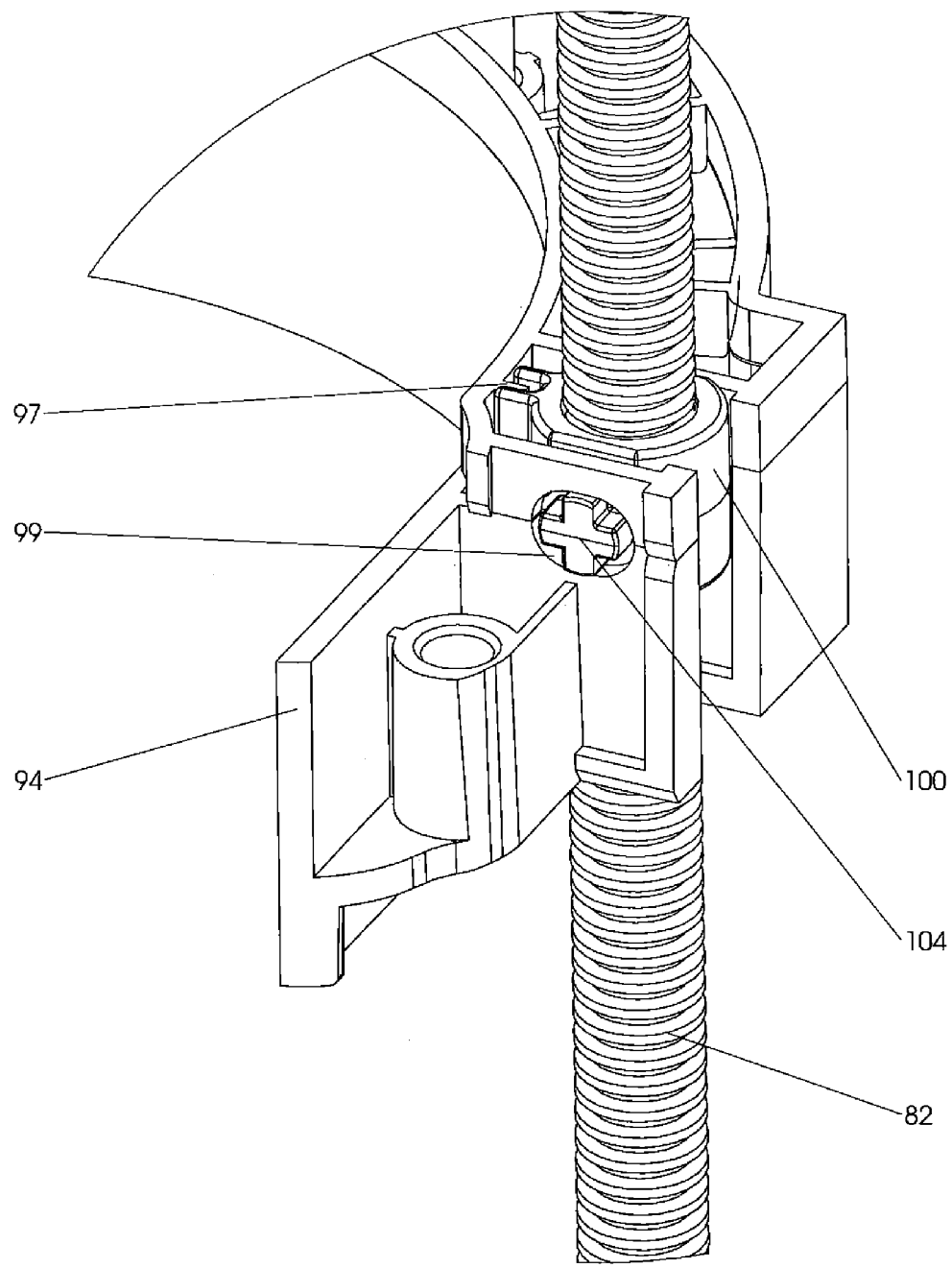
FIG. 22 is a perspective section view of the drive nut connecting a lead screw with the lower clamping jaw in the elevator assembly.
Figure 23:
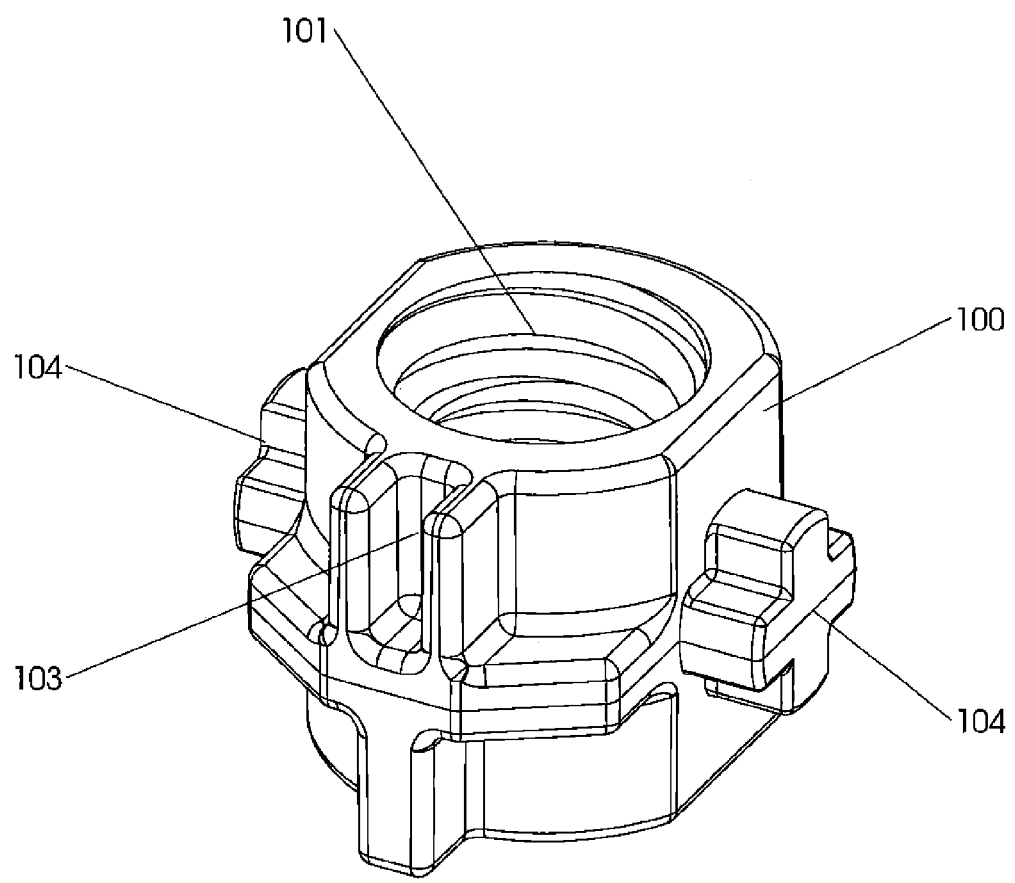
FIG. 23 is a perspective view of the FIG. 22 drive nut.

The dual lead screws 82 are each attached to the lower clamping jaw 94 through clamping jaw drive nuts 100. A clamping jaw drive nut 100 is more clearly shown in FIGS. 22 and 23. The drive nut 100 has an interior thread 101 which wraps around and meshes with the thread 86 of the lead screw 82. While the dual lead screws 82 are preferably constructed from machined metal, such as stainless steel, the drive nut 100 can be formed from either metal or plastic. The drive nut 100 is connected to the lower clamping jaw 94 through the interaction of the U-shaped channel 103 on the drive nut 100 with a matching protrusion 97 on the lower clamping jaw 94 as well as cross shaped protrusions 104 on two sides of the drive nut 100 which fit into openings 99 on the lower clamping jaw 94. The lower clamping jaw openings 99 are preferably oval in shape to allow a small degree of angular and horizontal translational movement for the cross shaped protrusions 104. To the extent the drive nuts 100 and lead screws 82 are not perfectly machined or suffer wear over time, the small degree of angular and horizontal translational movement allowed by the drive nut cross shaped protrusions 104 and oval openings 99 will help avoid any binding action as the clamping jaw 90 is driven up and down the lead screws 82. As those of skill in the art will recognize, other shapes for the drive nut protrusions and lower clamping jaw openings can be used to allow a small degree of angular and horizontal translational movement. For example, the drive nut protrusion can be circular in shape and fit within a larger oval opening.

Figure 24:
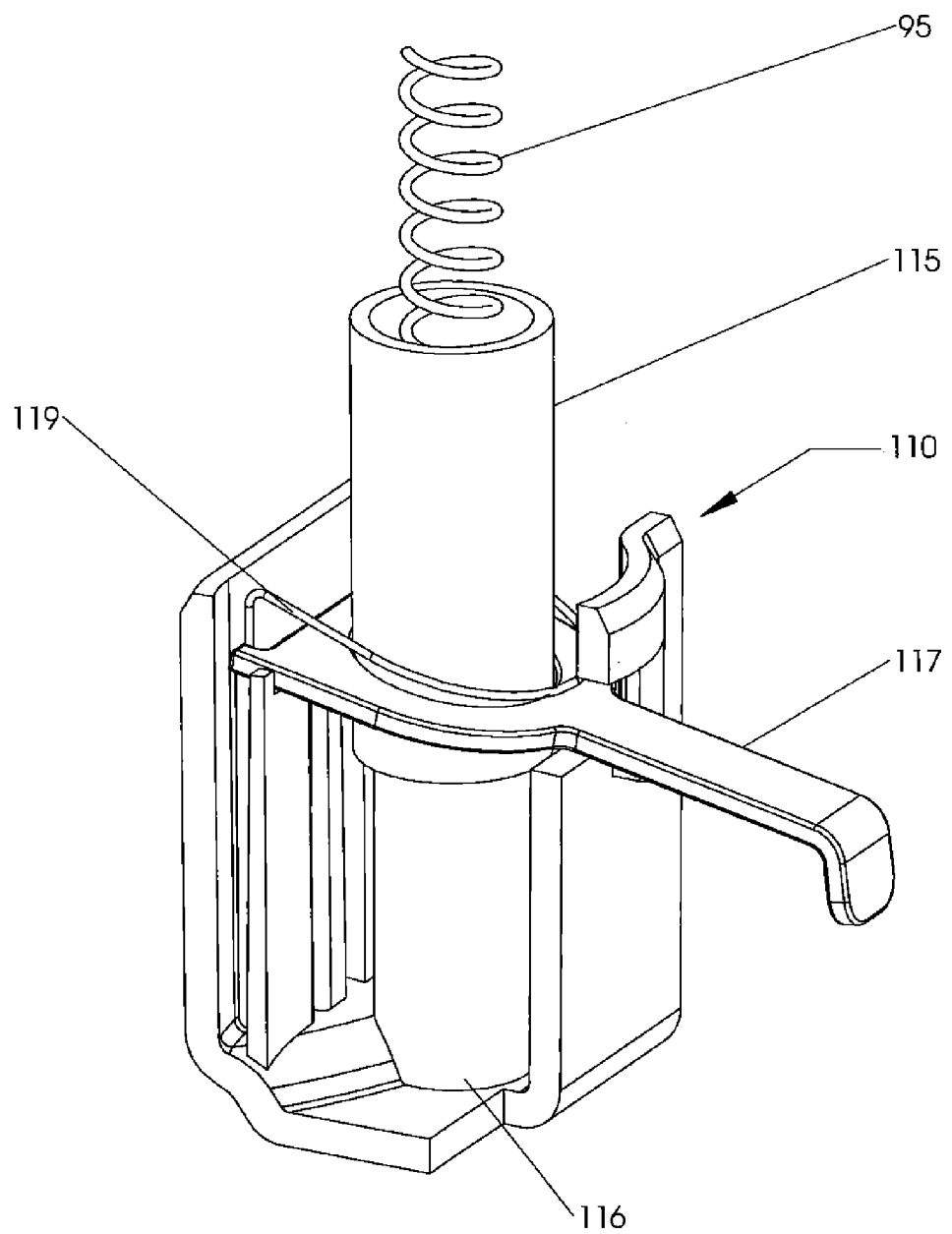
FIG. 24 is a perspective section view of the locking mechanism of the FIG. 21 clamping jaw.

FIG. 24 shows a cut-away view of the clamping jaw lever lock mechanism 110. The purpose of the clamping jaw lever lock mechanism 110 is to hold the upper 92 and lower 94 clamping jaws together as they are raising and lowering the cupholder 30 during blending while allowing the lower clamping jaw 94 to release from the upper clamping jaw 92 when the blending process is finished so that the user can easily remove the cupholder 30 from the blender 10 to enjoy the blended food or beverage product. The lever lock mechanism 110 accomplishes this objective through the interaction of lever lock mechanism biasing spring 119 with lever 117 and upper locking tube 115. During the blending process (see, FIGS. 11-13), the biasing spring 119 presses down on the lever 117 to wedge the upper locking tube 115 and, thereby, the lower clamping jaw 94 into a locked position. When the upper locking tube 115 is so wedged, the upper 92 and lower 94 clamping jaws travel up and down together as one piece, thereby firmly holding the cupholder 30 in place during blending. When the blending has been completed and the upper clamping jaw 92 drops down to its lowest position (see, FIG. 11), a shelf 118 (FIG. 8) built into the upper housing 12 will push the lever 117 upward to overcome the force of the biasing spring 119 and thereby allow the upper locking tube 115 to move freely. In this release position, the lower clamping jaw 94 can vertically separate from upper clamping jaw 92. In addition, when the lever 117 is pushed up into the horizontal release position, the lever 117 holds the upper clamping jaw 92 stationary while the lower clamping jaw 94 travels downward to the "home position." This vertical separation allows the cupholder 30 to be freely removed and reinserted. At the beginning of the next blending process after the cupholder 30 has been reinserted, the dual lead screws 82 will raise the lower clamping jaw 94 until it reconnects with the upper clamping jaw 92 and continues its upward movement to the point where biasing spring 119 again presses the lever 117 into its downward locking position so that the upper 92 and lower 94 clamping jaws are locked together during blending.

Figure 30:
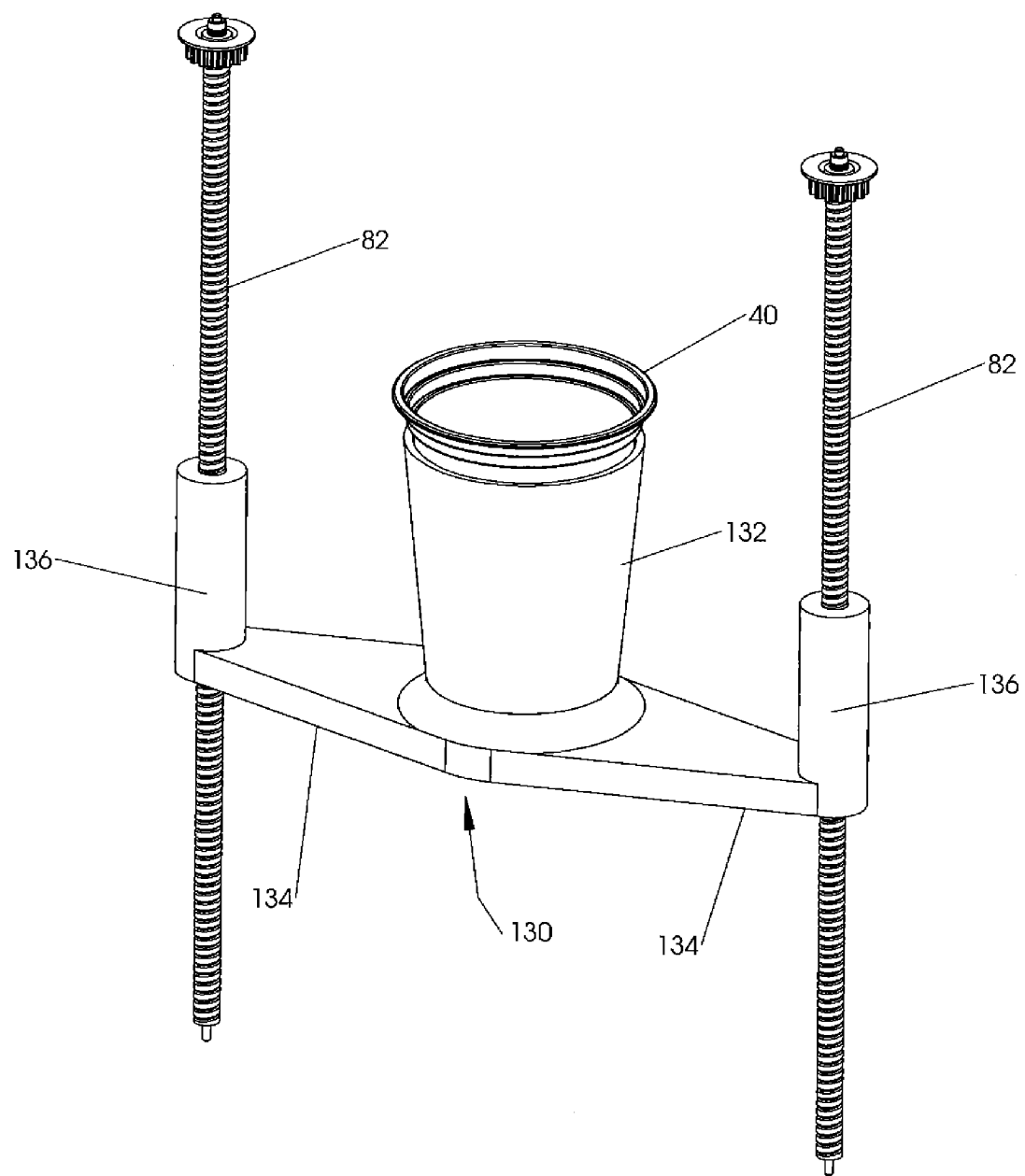

FIG. 30 shows an alternative elevator assembly embodiment that does not rely on a clamping jaw 90 to hold the cupholder during blending. In the FIG. 30 embodiment, the cupholder 132 is part of an elevator bracket assembly 130 which connects the cupholder 132 to lead screw nuts 136 through bracket arms 134. To blend food or beverage using this alternative embodiment, one places the cup 40 with the food or beverage into the top of the cupholder 132. The interaction of the dual lead screws 82 with the lead screw nuts 136 can then raise and lower the elevator bracket assembly 130 during the blending process. As in the preferred embodiment, the spindle assembly (not shown) remains in a fixed position while the food or beverage cup 40 is moved up and down. As compared with the preferred embodiment, this alternative embodiment is more simple to manufacture. Nonetheless, this alternative embodiment has the disadvantage of requiring more space because, as in the F'real commercial blenders, the cup 40 must be inserted into the cupholder 132 from above. This means that the alternative embodiment blender must be large enough to provide room for the cup 40 to be inserted into the cupholder 132 from above.

FIGS. 25 and 26 are cut-away top and rear views, respectively, of the blender 10 of the present invention illustrating the preferred location and operation of the spindle motor 120 and the dual lead screw motor 126 (FIG. 26). A spindle belt or chain 129 preferably connects a pulley 124 on top of the spindle motor 120 with a pulley 122 coupled to the spindle assembly 70. It is through this spindle belt or chain 129 that rotational energy from the spindle motor 120 translates into turning the rotating shaft 76 and rotating cutting blades 72 of the spindle assembly 70. In the preferred embodiment, associated with the spindle motor 120 is a spindle motor encoder 121 which detects and helps control the speed of the spindle motor 120. As previously noted, the dual lead screw belt or chain 84 connects the dual lead screw motor 126 to the dual lead screws 82 through their respective pulleys 128, 83. Like the spindle motor 120, the dual lead screw motor 126 also has a dual lead screw motor encoder 127 to detect and help control the operation of the dual lead screw motor 126. By detecting the angular position of the dual lead screw motor, the dual lead screw motor encoder 127 can, in conjunction with microcontroller 140 (FIG. 27), calculate the vertical position of the clamping jaw 90. To overcome the potential cumulative effect of occasional missed encoder counts, a "home" sensor 145 (FIG. 26) is preferably used with the encoder 127 to ensure that the clamping jaw 90 always returns to the same starting "home position" at the end of the blending cycle. In alternative embodiments, the position of the clamping jaw 90 can be determined through, for example, a combination of "high position", "low position" and "home position" sensors that are positioned along the travel path of the clamping jaw 90. Where multiple sensors are used in these positions, the microcontroller would not need to rely upon a dual lead screw motor encoder 127. These sensors could, for example, be electrical or electro-mechanical devices, such as magnets activating "Hall Effect" sensors or switches.

Figure 27:
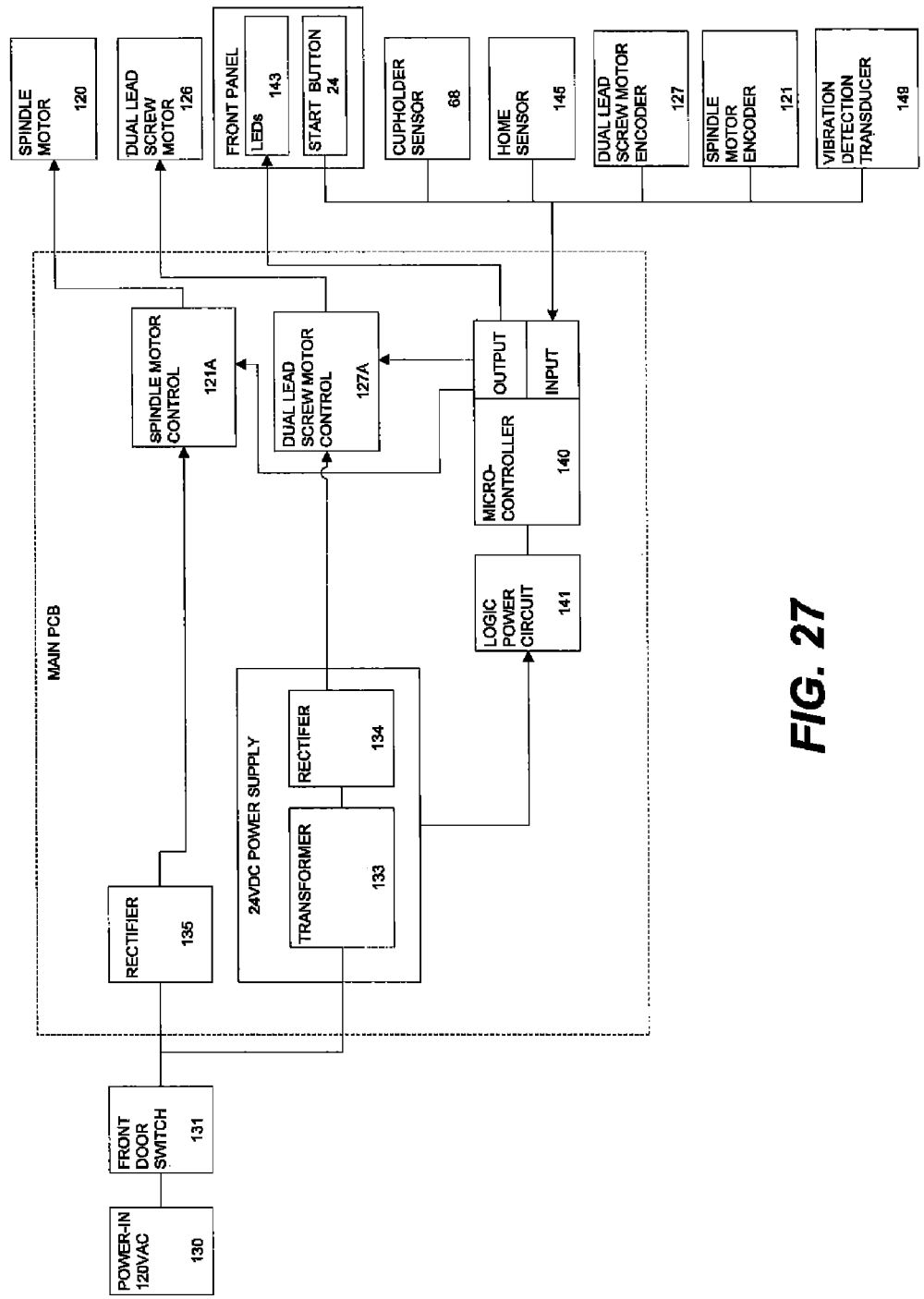
FIG. 27 shows an electrical block diagram for the preferred blender of the present invention.

FIG. 27 is an electrical block diagram for the blender 10 of the present invention. The blender of the present invention preferably receives its power from an alternating voltage source, such as a household electrical outlet. Those of skill in the art will recognize, though, that other electrical sources could be used, such as batteries. A switch, such as an "on/off" switch (not shown) may be present on the blender 10 to shut off power to the blender 10 when the blender is not in use. The start button 24 on the front door housing 20, in some embodiments, can serve as such an "on/off" switch. For the reasons previously noted, the blender is prevented from operating if the front housing door 20 is in an open position. In the preferred embodiment, the front door latch 22 acts as a switch 131 to prevent electricity from reaching the motorized parts of the blender 10 if the front door latch 22 is open. Rectifiers 134, 135 are preferably used to convert alternating current into direct current for the spindle motor 120/spindle motor control 121A as well as dual lead screw motor 126/dual lead screw motor control 127A. Transformer 133/Logic Power Circuit 141 are preferably used to step down the voltage to more usable levels, particularly for the microcontroller 140. The microcontroller 140 receives numerous inputs to allow it to safely operate the blender 10 of the present invention, including inputs from cupholder sensor 68, the start button 24, clamping jaw "home" sensor 145 (FIG. 26), the dual lead screw motor encoder 127, the spindle motor encoder 121 and a vibration detection transducer 149. For example, the cupholder 30 must be sensed in the proper position by cupholder sensor 68 before blending can take place. Assuming that the latch 22 is properly closed and the cupholder is sensed to be in the correct position, the microcontroller 140 preferably lights up, at least temporarily, the start button 24 and/or an LED display 143 near the start button 24 to tell the user that the blender is ready for operation. The microcontroller 140 then waits until the user presses the start button 24 to begin blending. The vibration detection transducer 149 senses whether the blender is undergoing excessive vibration indicative of improper use. For example, if the user fails to add liquid to a frozen beverage before blending, the frozen beverage can form a thick slurry which adheres to the rotating cutting blades 72 of the spindle assembly 70 during blending and, in some instances, causes excessive vibration of the blender. If excessive vibration is sensed by the vibration detection transducer 149, the spindle motor 120 will preferably be stopped and the clamping jaw 90 will be returned to its "home position" (i.e., so that the rotating cutting blades 72 will be disengaged from the food or beverage in the cup). After a period of time, the microcontroller 140 can reset to allow continued operation of the blender. The vibration detection transducer 149 can take a number of forms, including an accelerometer, a switch or a microphone.

To perform the blending process, the microcontroller 140 sends signals to the dual lead screw motor control 127A to have the dual lead screw motor 126 turn the dual lead screws 82 to raise and lower the cupholder 30. Simultaneously, the microcontroller 140 will have the spindle motor control 121A operate the spindle motor 120 so that the food or beverage is being blended as the cupholder 30 is moved up and down. During the blending process, the microcontroller 140 can receive inputs from, in the preferred embodiment, the dual lead screw motor encoder 126 and the "home position" sensor 145 so that the microcontroller 140 can tell the dual lead screw control 127A to have the dual lead screw motor 126 initiate movement, reverse movement or stop movement, as appropriate.

Figure 28:
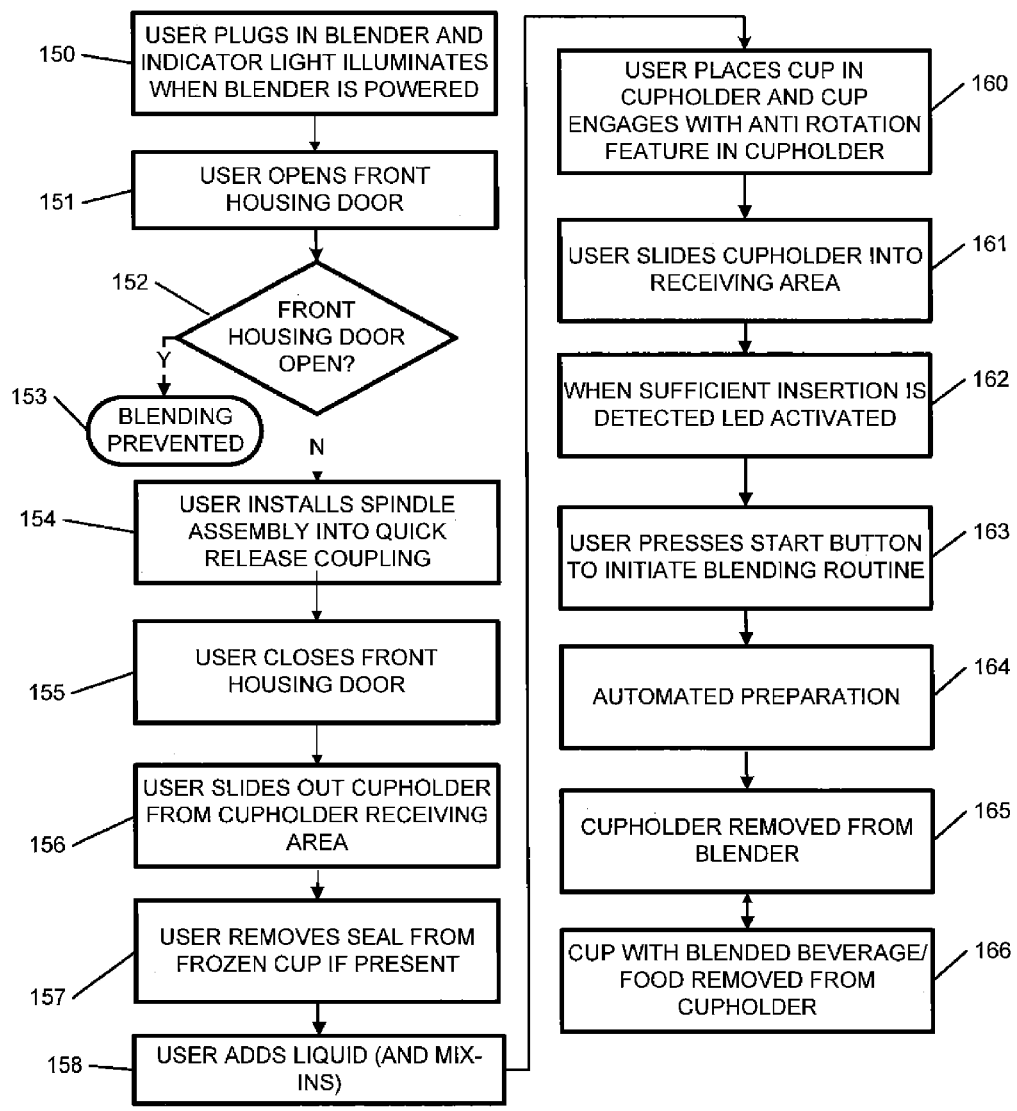
FIG. 28 is a flow chart illustrating the general steps from the user's perspective to prepare smoothies and milkshakes using the preferred blender of the present invention.
Figure 29A:
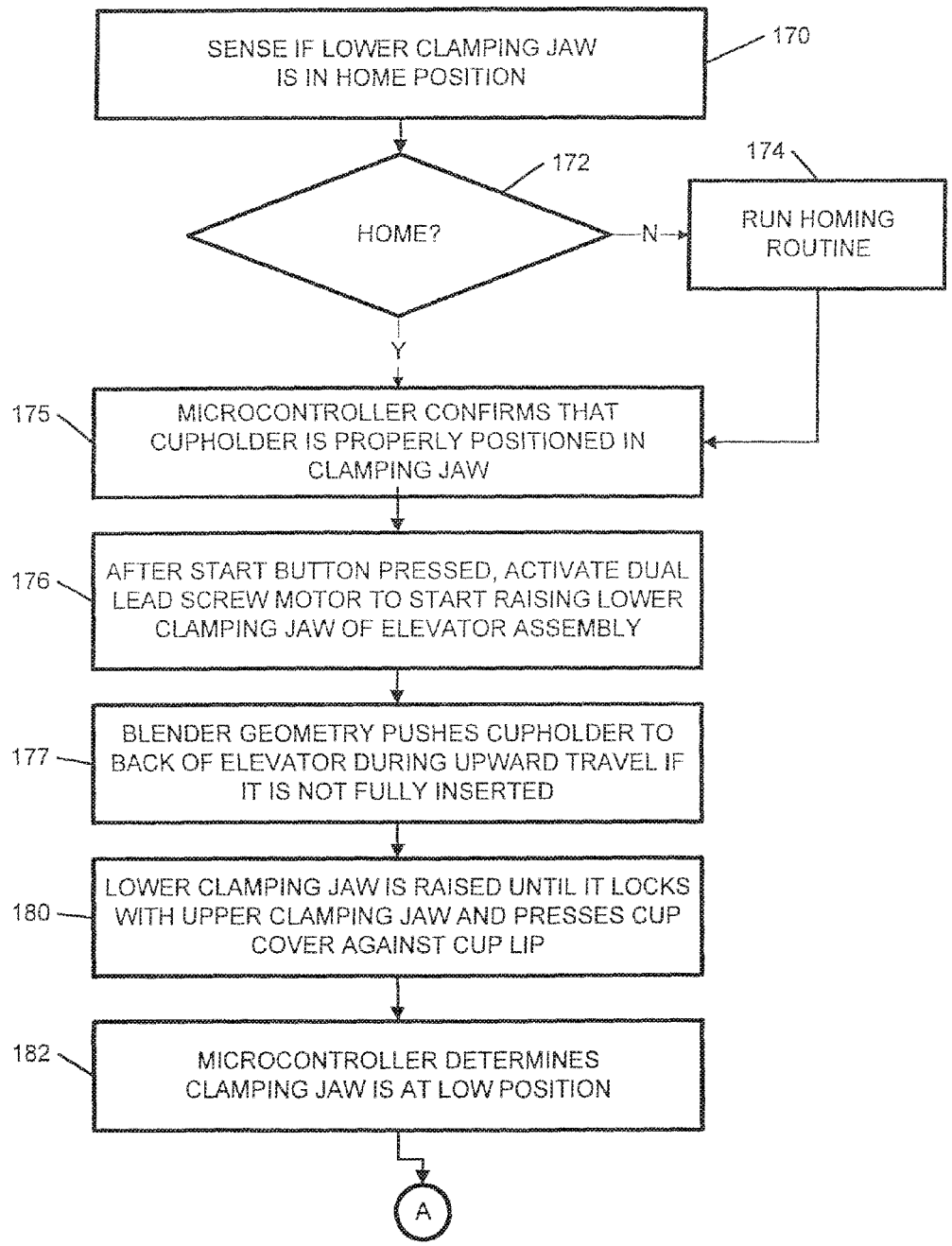
FIG. 29A-D is a logic flow chart illustrating the steps from the microcontroller's perspective to prepare smoothies and milkshakes using the preferred blender of the present invention; and, FIG. 30 is a perspective view of an alternative embodiment where the cup and cupholder can be raised and lowered by dual lead screws without the presence of a clamping jaw.
Figure 29B:
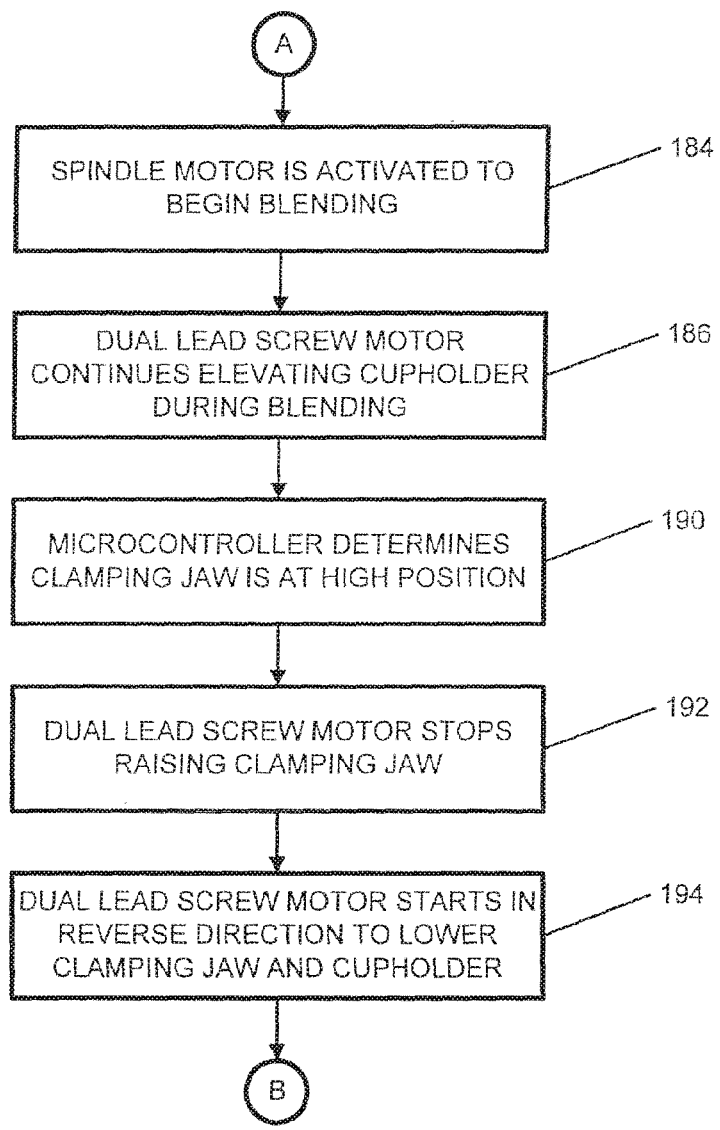
Figure 29C:
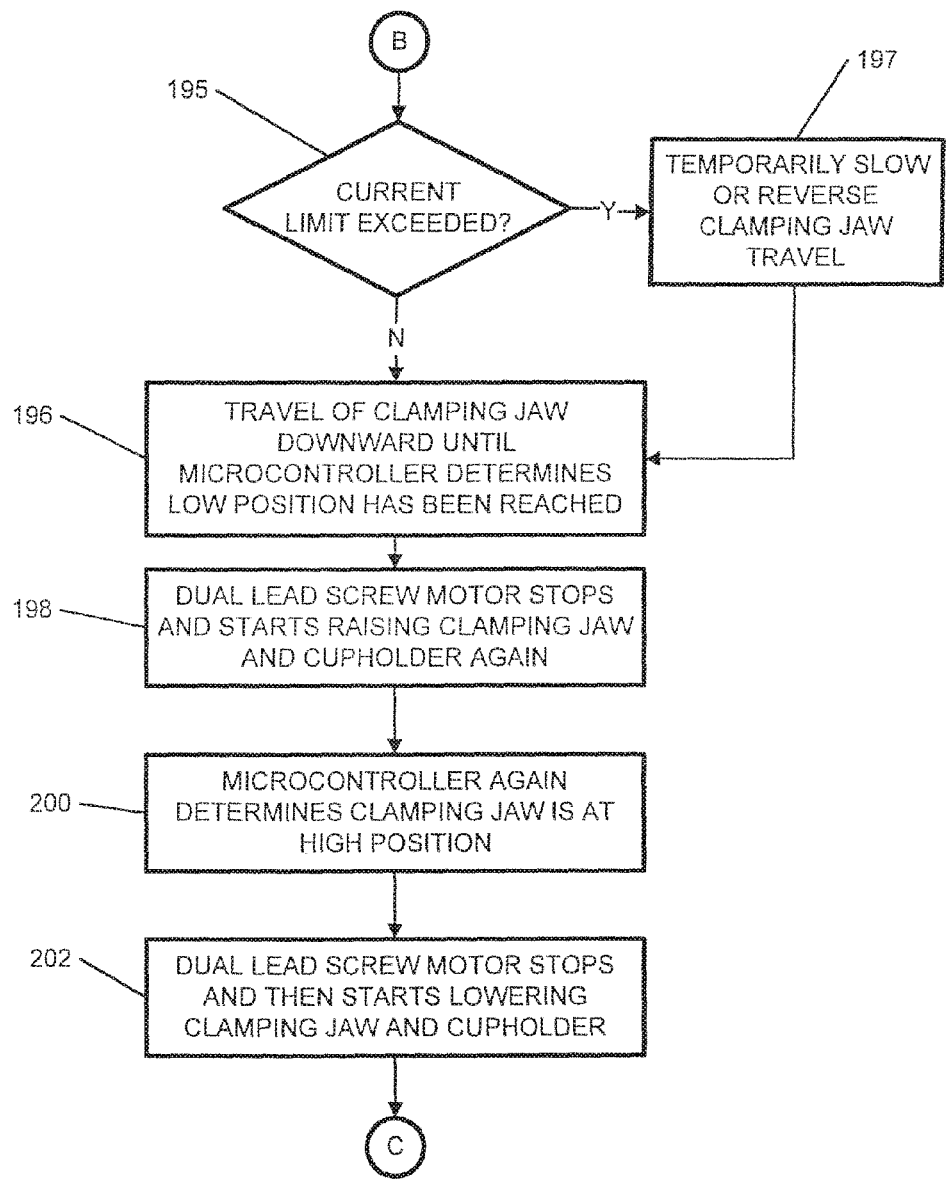
Figure 29D:
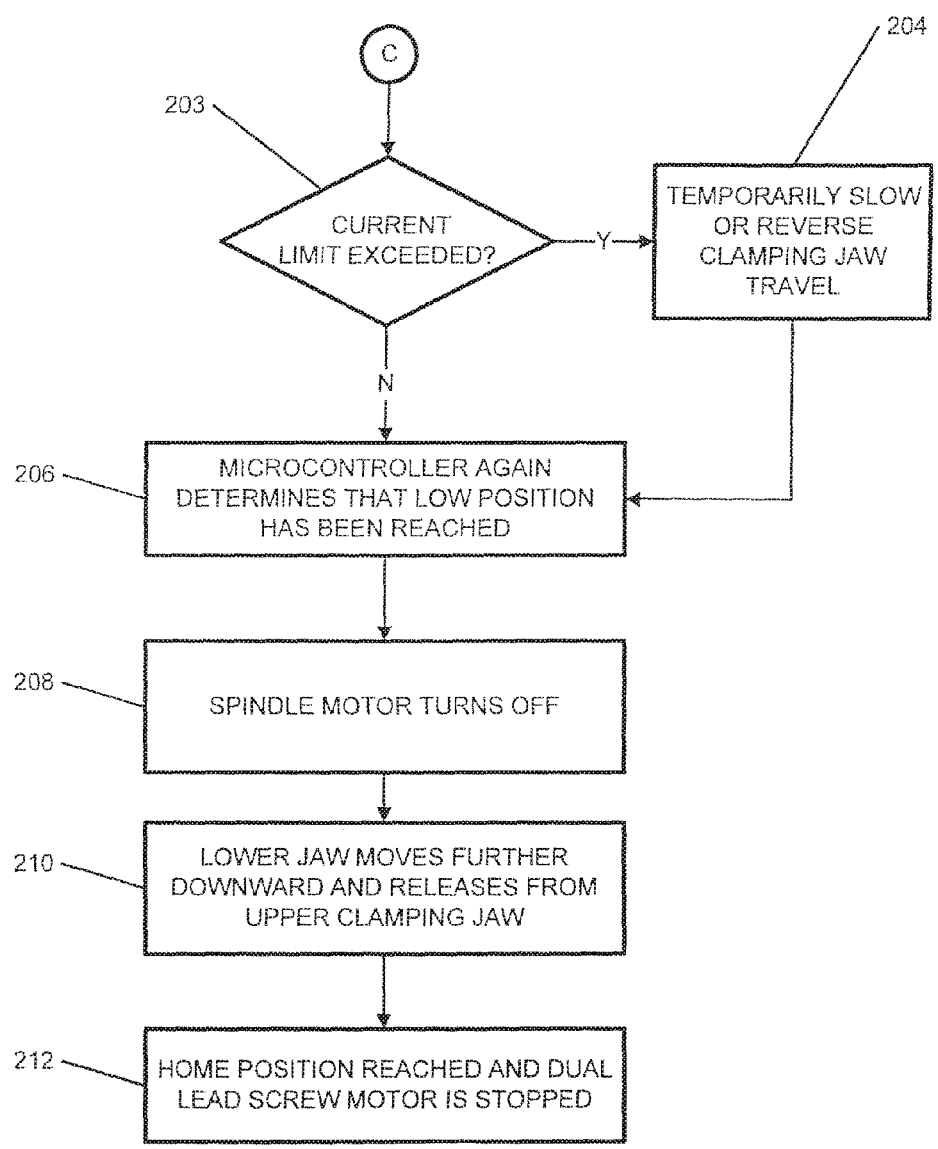

FIG. 28 illustrates the steps a user would typically go through to prepare smoothies and milkshakes using the blender 10 of the present invention when the blender is first used. First, the user will plug in the blender [150]. Preferably, after the blender is plugged in, an "on/off" switch or the start button 24 will light up, at least temporarily, to show the user that the blender 10 is ready for operation. As a safety feature, the blender will not operate if the front door is open [152, 153]. If the spindle assembly 70 has not yet been installed, the user will need to open the front housing door [151] to install the spindle assembly 70 into the quick release coupling [154]. After the spindle assembly has been properly installed, the user closes the front housing door [155].

The user can then remove the cupholder from the cupholder receiving area [156] so that a cup with frozen food or beverage can be placed in the cupholder [157-160]. To prevent contamination, the cup with frozen food or beverage preferably has a tear off seal that must be removed to expose the frozen food or beverage [157]. In the preferred embodiment, the user then adds liquid, such as water or milk, to the frozen food or beverage up to a recommended level to facilitate the blending process [158]. At this point, the user may also add mix-ins, such as fresh fruit or protein powder. The cup should then be dropped into the cupholder so that the anti-rotational surfaces of the cup and cupholder can engage with one another [160]. After the anti-rotational surfaces have engaged, the cup/cupholder are slid horizontally into the cupholder receiving area so that cupholder lip 34 is between the upper and lower clamping jaws [161]. In the preferred embodiment, the start button or an LED display will tell the user if the cupholder has been properly inserted [162]. After proper insertion, the user can press the start button 24 to initiate the blending routine [163], which then takes place automatically [164] without any further work by the user. When the blending process has been completed, the clamping jaws will release the cupholder so that the user can remove the cupholder from the blender [165] and enjoy the blended food/beverage in the cup after the cup is removed from the cupholder [166].

FIG. 29A-D summarizes the blending process of the present invention from the perspective of the blender 10 and, particularly, its microcontroller 140. Before blending takes place, the microcontroller 140 preferably uses the "home position" sensor 145 to sense whether the clamping jaw 90 is in the proper starting or "home position" [170]. If not [172], the dual lead screw motor will be activated to move the lower clamping jaw down to the proper "home position" [174]. Once the lower clamping jaw 94 is confirmed to be in the "home position" and the microcontroller confirms that the cupholder is properly inserted between the upper and lower clamping jaws [175], the blender can be activated by pressing the start button 24. After the start button 24 is then pushed, the microcontroller 140 activates the dual lead screw motor 126 to start raising the lower clamping jaw 94 of the elevator assembly [176]. The ramped geometry on the underside of the front door 20 and cupholder lip 34 urge the cupholder 30 into the correct position, if it is not already there [177]. The lower clamping jaw 94 is then raised from its "home position" until it locks with the upper clamping jaw 92 and, in the process, firmly clamps the cupholder lip 34 as well as presses the cup cover 74 against the cup lip [180]. At this point, in the preferred embodiment, the microcontroller 140 uses information received from the dual lead screw motor encoder 127 to calculate when the clamping jaw 90 reaches the "low position" [182]. When the clamping jaw 90 is in the "low position", the microcontroller 140 can start the blending process through activation of the spindle motor [184].

The spindle motor 120 continues to blend the food or beverage in the cup or cupholder as the elevator assembly lifts the cupholder upward [186]. Since the rotating cutting blades of the spindle assembly are in a fixed position, those rotating cutting blades will blend progressively lower levels of the food or beverage as the cup and/or cupholder are raised by the elevator assembly [186]. As the clamping jaw 90 of the elevator assembly reaches its highest position, the microcontroller 140 determines that the "high position" has been reached using its dual lead screw encoder 127 or, in some embodiments, it receives a signal from a "high position" sensor [190]. This determination causes the microcontroller 140 to stop the dual lead screw motor from continuing to raise the clamping jaw [192]. After a brief pause, the microcontroller 140 directs the dual lead screw motor 126 to begin lowering the clamping jaw and cupholder [194]. As the clamping jaw and cupholder are lowered between the "high" and "low" positions, the rotating cutting blades will blend progressively higher levels of food or beverage in the cup and/or cupholder. The dual lead screw motor continues lowering the clamping jaw and cupholder until the microcontroller 140 determines that the clamping jaw 90 has reached the "low position" [196]. After reaching the "low position", the microcontroller 140 instructs the dual lead screw motor 126 to stop lowering the clamping jaw and cupholder if further blending is desired [198]. During the raising and/or lowering process as blending takes place, the microcontroller 140 can monitor the amount of current used to make sure it does not exceed pre-determined limits [195, 203]. If the pre-determined current limit is exceeded, the microcontroller will temporarily slow travel or reverse the direction of travel [197, 204].

In the preferred embodiment, the rotating cutting blades pass through the food or beverage multiple times before the blending is complete (see FIG. 14). For example, if two complete cycles are desired, the microcontroller 140 will direct the dual lead screw motor to raise the clamping jaw and cupholder for a second time [198] until the microcontroller determines that the clamping jaw has again reached the "high position" [200]. At that point, the dual lead screw motor 126 will lower the clamping jaw and cupholder for a second time [202] until the microcontroller determines that the "low position" has again been reached [206]. In this two cycle embodiment, the blending will now be complete so that the microcontroller can turn off the spindle motor [208]. To allow the user to access the blended food or beverage, the dual lead screw motor 126 will further lower the clamping jaw from the "low position" to the "home position" [210] which will simultaneously separate the upper clamping jaw 92 from the lower clamping jaw 94 and remove the cup cover 74 from the cup lip 41. As the "home position" is reached, the microcontroller 140 will stop the dual lead screw motor [212] so that the user can remove the cupholder with the blended food or beverage product while none of the blender motors are operating.

In the foregoing specification, the invention has been described with reference to specific preferred embodiments and methods. It will, however, be evident to those of skill in the art that various modifications and changes may be made without departing from the broader spirit and scope of the invention as set forth in the appended claims. The specification and drawings are, accordingly, to be regarded in an illustrative, rather than restrictive sense; the invention being limited only by the appended claims.

What is claimed is:

1. A method for blending food or beverage in a blender comprising the steps of:
    placing a container with food or beverage in a variable separation clamping jaw of a motorized, multiple lead screw elevator assembly;
    using said multiple lead screws of said elevator assembly to move said container upward to both close said clamping jaw and place said food or beverage in contact with a blending tool;
    while keeping said blending tool in a vertically stationary position, using said blending tool to blend successively lower layers of said food or beverage in said container as said elevator assembly moves said container upward;

stopping the upward movement of said container when said blending tool is blending food or beverage at or near the bottom of said container;

reversing the direction of said container so that the multiple lead screws of said elevator assembly move said container downward while said blending tool blends successively higher layers of said food or beverage in said container;

stopping operation of said blending tool when said blending tool is blending food or beverage at or near the top of said container;

opening said clamping jaw using said multiple lead screws; and, removing said container from said clamping jaw to allow the blended food or beverage in said container to be consumed.

2. The method of claim 1 wherein said multiple lead screws are dual lead screws on opposite sides of said container.

3. The method of claim 1 wherein said clamping jaw attaches a cover to the top of said container before blending.

4. The method of claim 1 wherein said blending tool is part of a motor driven spindle assembly.

5. The method of claim 1 wherein said food or beverage are frozen before blending.

6. The method of claim 5 wherein water or other liquid is added to said frozen food or beverage before blending.

7. The method of claim 1 wherein said container is a cupholder.

8. The method of claim 1 wherein said container is a cup held by a cupholder.

9. The method of claim 8 wherein said cup and cupholder both have complementary anti-rotational surfaces to prevent them from rotating with respect to one another during the blending process.

10. The method of claim 4 wherein said spindle assembly has a movable cover which attaches to an opening on said container during the blending process to prevent food or beverage from spilling out.

11. A method for blending food or beverage in a blender comprising the steps of:

placing a container with food or beverage below a movable container cover as well as between an upper clamping jaw and a lower clamping jaw of a blender;

using a motor to move said upper clamping jaw and lower clamping jaw together to attach said cover to said container and secure said container;

moving said clamping jaws, container cover and container upward so that said food or beverage is placed in contact with a rotatable blending tool of a spindle;

while keeping said blending tool in a vertically stationary position, using said blending tool to blend successively lower layers of said food or beverage in said container as said clamping jaw, container cover and container move upward;

stopping the upward movement of said clamping jaws, container cover and container when said blending tool is blending food or beverage at or near the bottom of said container;

reversing the direction of said clamping jaws, container cover and container so that they move downward while said blending tool blends successively higher layers of said food or beverage in said container;

stopping operation of said blending tool when said blending tool is blending food or beverage at or near the top of said container;

using said motor to cause said clamping jaws to separate so that the container cover detaches from the container and the container with blended food or beverage can be removed from said clamping jaws and consumed.

12. The method of claim 11 wherein said container cover covers to an opening at the top of said container.

13. The method of claim 11 wherein said clamping jaws, container cover and container are raised and lowered by a motor driven multiple lead screw assembly.

14. The method of claim 11 wherein said spindle is motor driven and said blending tool is a rotating cutting blade.

15. The method of claim 11 wherein said food or beverage are frozen before blending.

16. The method of claim 15 wherein water or other liquid is added to said frozen food or beverage before blending.

17. The method of claim 11 wherein said container is a cupholder.

18. The method of claim 11 wherein said container is a cup held by a cupholder.

19. The method of claim 18 wherein said cup and cupholder both have complementary anti-rotational surfaces to prevent them from rotating with respect to one another during the blending process.

20. The method of claim 11 wherein said spindle has a rotating shaft that protrudes through an opening in said movable container cover.

21. The method of claim 11 further comprising a controller to control the blending operation of the spindle as well as controlling the movement of the clamping jaws and container.

\* \* \* \* \*